United States Patent [19]

Nagashima et al.

[11] Patent Number: 5,440,731
[45] Date of Patent: Aug. 8, 1995

[54] METHOD OF DETECTING UNJUSTIFIABLE RELOADING OF STORED DATA

[75] Inventors: Masaaki Nagashima, Kawasaki; Tadashi Yamakawa; Takayuki Sasaki, both of Yokohama; Yasuhiro Okuno, Kawasaki; Takahiro Kurosawa, Yokohama, all of Japan

[73] Assignee: Canon Kabushiki Kaisha, Tokyo, Japan

[21] Appl. No.: 851,206

[22] Filed: Mar. 13, 1992

[30] Foreign Application Priority Data

| Mar. 15, 1991 | [JP] | Japan | 3-51272 |
| Mar. 15, 1991 | [JP] | Japan | 3-51274 |
| Mar. 15, 1991 | [JP] | Japan | 3-51275 |
| Mar. 15, 1991 | [JP] | Japan | 3-51276 |
| Mar. 15, 1991 | [JP] | Japan | 3-51278 |
| Mar. 15, 1991 | [JP] | Japan | 3-51280 |

[51] Int. Cl.$^6$ ............................................. G06F 15/40
[52] U.S. Cl. ............................... 395/600; 364/DIG. 1; 364/282.1; 364/283.1; 364/286.4; 364/286.5
[58] Field of Search ................................ 395/600, 700

[56] References Cited

U.S. PATENT DOCUMENTS

| 3,920,976 | 11/1975 | Christiansen et al. | 235/153 |
| 4,799,156 | 1/1989 | Shavit et al. | 364/401 |
| 5,050,213 | 9/1991 | Shear | 380/25 |

OTHER PUBLICATIONS

"Shared Books: Collaborative Publication Management for an Office Information System" ACM Conf. on Office Information Systems, B. T. Lewis et al, Mar. 1988, Palo Alto, US, pp. 197–204.
"The Eden System: A Technical Review" IEEE Transactions on Software Engineering, G. T. Almes et al., vol. SE-11, No. 1, Jan. 1985, New York, US, pp. 43–59.
"Quilt: A Collaborative Tool for Co-Operative Writing" ACM Conf. on Office Information Systems, R. S. Fish et al. Mar. 1988, Palo Alto, US, pp. 30–37.

*Primary Examiner*—Kevin A. Kriess
*Attorney, Agent, or Firm*—Fitzpatrick, Cella, Harper & Scinto

[57] ABSTRACT

A method of discriminating, for each first level partial data, whether or not saved data, one file of which is composed of a plurality of the first level partial data and each of the first level partial data is able to include a second level partial data, has been unjustifiably rewritten. The method includes the steps of at a time of saving a file, designating a first level partial data on the basis of a user instruction, receiving a password from a user, converting the received password and the designated first level partial data, which includes second level partial data, according to a predetermined procedure to generate a first code and saving the file with storing of the first code to correspond to the designated first level partial data. At a time of reading the saved file, reading the saved file, designating the first level partial data on the basis of a user instruction, receiving the password from the user, converting the received password and the designated first level partial data, which includes the second level partial data if the designated first level partial data includes the second level partial data, according to the predetermined procedure to generate a second code. The method compares the generated second code with the first code stored to correspond to the designated first level partial data, and discriminates that the designated first level partial data has been unjustifiably rewritten if comparison results in a fact that the first code is not equal to the second code.

34 Claims, 37 Drawing Sheets

FIG. 8

⟨ AAAAA················
·····················
·······

⟨ BBBBB··············
·················
········⟩

CCCCC···············
····⟩

⟨ OOO
⟨ OOO ⟩
OOO ⟩

FIG. 9

```
⟨ AAAAA · · · · · · · · · · · · ·
  · · · · · · · · · · · · · · · ·
  · · · · · ·

⟨ BBBBB · · · · · · · · · · · · ·
  · · · · · · · · · · · · · · · ·
  · · · · · · · ⟩

CCCCC · · · · · · · · · · · · · ·
· · · · ⟩
```

⟨ OOO
 ⟨ OOO ⟩
  OOO ⟩

〈AAAAA・・・・・・・・・・・
・・・・・・・・・・・・・・・・
・・・・・・

〈BBBBB・・・・・・・・・・
・・・・・・・・・・・・・・・
・・・・・・・〉

CCCCC・・・・・・・・・・・
・・・・␣ ?????〉

〈OOO
〈OOO〉
OOO␣ !!!!!〉

FIG. 15

⟨a⟩
⟨AAAAA··············
·················
···

⟨b⟩
⟨BBBBB··········
·············
·······

⟨/b⟩
CCCCC············
····

⟨/a⟩
⟨c⟩
ooo
⟨D⟩
ooo
⟨/D⟩
ooo
⟨/c⟩

FIG. 17

⟨a⟩
 ⟨AAAAA・・・・・・・・・・
  ・・・・・・・・・・・・・・・
  ・・・

⟨b⟩
  ⟨BBBBB・・・・・・・・・
   ・・・・・・・・・・・・・
   ・・・・・・・

⟨/b⟩
   CCCCC・・・・・・・・・・・
   ・・・・

⟨/a ????? ⟩
⟨c⟩
   ooo
   ⟨D⟩
    ooo
   ⟨/D⟩
    ooo
⟨/c !!!!! ⟩

FIG. 20

⟨a⟩
　AAAAA・・・・・・・・・・・
　・・・・・・・・・・・・・
　・・・

⟨b⟩
　⟨BBBBB・・・・・・・・・・
　・・・・・・・・・・・・・
　・・・・・・・

⟨/b⟩
　CCCCC・・・・・・・・・・・
　・・・

```
<a>
    AAAAA..............
    ..................
    ...
    <b>
      BBBBB...........
      ..................
      ........

</b>
    CCCCC.............
    ....
</a>
<C>
    OOO
    <D>
      OOO
    </D>
    OOO
</C>
```

FIG. 24

⟨ AAAAA·······
·········
⟨ BBBBB·······
·······
⟨ CCCCC·····
········
⟨ DDDDD··
····⟩
····⟩
······⟩
⟨ EEEEE·····
·······
⟨ FFFFF··
····⟩
··⟩
····⟩

EXTRACTED CHARACTER TRAIN

BBBBB・・・・・〈 〉・・・・

EXTRACTED CHARACTER TRAIN

BBBBB・・〈 CCCCC・・〈 DDDDD・・ 〉・・ 〉・・・・

FIG. 27

```
〈 AAAAA・・・・・・
・・・・・・・・・・
〈 BBBBB・・・・・・
・・・・・・
    〈 CCCCC・・・・・
    ・・・・・・・
        〈 DDDDD・・
        ・・・・・ 〉
    ・・・・・ 〉
    ・・・・・・ ␣ ????? 〉
〈 EEEEE・・・・・
・・・・・・
〈 FFFFF・・
・・・・・ 〉
・・ 〉
・・・・ 〉
```

FIG. 29

```
(a) AAAAA·······
·········
  (b) BBBBB·······
  ······
    (c) CCCCC·····
    ·······
      (d) DDDDD··
      ····〈/d〉
      ····〈/c〉
    ···〈/b〉
  (e) EEEEE·····
  ·······
    (f) FFFFF··
    ····〈/f〉
  ······〈/e〉
········〈/a〉
```

TEXT DATA EXAMPLE

⟨a⟩ AAAAA······
············
⟨b⟩ BBBBB······
·······
⟨c⟩ CCCCC······
·······
⟨d⟩ DDDDD··
····⟨/d⟩
····⟨/c⟩
···⟨/b⟩
⟨e⟩ EEEEE·····
·······
⟨f⟩ FFFFF··
····⟨/f⟩
······⟨/e⟩
········⟨/a⟩

FIG. 31B

TEXT DATA EXAMPLE

BBBBB··⟨c⟩ CCCCC··⟨d⟩ DDDDD··⟨/d⟩··⟨/c⟩··

FIG. 32

⟨a⟩ AAAAA・・・・・
・・・・・・・・・
⟨b⟩ BBBBB・・・・・・
・・・・・・
⟨c⟩ CCCCC・・・・・
・・・・・・・
⟨d⟩ DDDDD・・
・・・・ ⟨/d⟩
・・・・ ⟨/c⟩
・・・ ⟨/b ␣?????⟩
⟨e⟩ EEEE・・・・・
・・・・・・・
⟨f⟩ FFFFF・・
・・・・ ⟨/f⟩
・・・・・・ ⟨/e⟩
・・・・・・・ ⟨/a⟩

FIG. 33

| TEXT ELEMENT NAME | AUTHOR |
|---|---|
| a | Suzuki |
| b | Sato |
| d | Nakano |
| e | Kondo |

```
⟨a  author = Suzuki ⟩ A A A A A ⋯
        ⋯⋯⋯⋯⋯⋯⋯⋯
     ⟨b  author = Sato ⟩ B B B B B ⋯⋯
           ⋯⋯⋯⋯⋯⋯
           ⟨c⟩  C C C C C ⋯⋯⋯⋯
              ⋯⋯⋯⋯⋯⋯
                  ⟨d  author = Nakano ⟩ D D D D D
                      ⋯⋯⋯⋯⋯⋯ ⟨/d⟩
               ⋯⋯⋯⋯ ⟨/c⟩
      ⋯⋯⋯⋯ ⟨/b⟩
⟨e  author = Kondo  E E E E E ⋯⋯
      ⋯⋯⋯⋯⋯
     ⟨f⟩  F F F F F ⋯⋯⋯
         ⋯⋯⋯⋯ ⟨/f⟩
      ⋯⋯⋯⋯⋯ ⟨/e⟩
   ⋯⋯⋯⋯⋯⋯ ⟨/a⟩
```

```
<a group = 1> A A A A A • • •
• • • • • • • • •
   <b group = 2> B B B B B • • • • •
   • • • • • • •
      <c group = 1> C C C C C • • • •
      • • • • • • •
         <d group = 2> D D D D D • • •
         • • • • • </d>
      • • • • • </c>
   • • • </b>
<e group = 1> E E E E E • • •
• • • • • • •
   <f group = 1> F F F F F • • •
   • • • • • </f>
• • • • • • • </e>
• • • • • • • • </a>
```

METHOD OF DETECTING UNJUSTIFIABLE RELOADING OF STORED DATA

BACKGROUND OF THE INVENTION

1. Field of the Invention

The present invention relates to a method of detecting whether or not the contents of data stored in a data processing system for preparing/registering/controlling texts and programs and comprising a plurality of data elements are justifiable data prepared and stored by a justifiable user in such a manner that a discrimination is made for each data element in a case where one data element is able to include other data elements and capable of detecting a fact that unjustifiable reloading of data has been performed if reloading has been performed.

2. Related Background Art

Hitherto, operations of preparing texts on a computer to store them as files have been performed.

In a case where the text file is the target of a cooperative work by a plurality of users, a method has been employed in which the file is held in common and access to the file by other users is inhibited.

For example, in a UNIX operating system, writing, referring (reading) and executing each file by the owner of the file, a cooperation group and other users can be permitted.

In the system of the aforesaid type, if setting is made in this way that a certain file is held in common by users in a group and change of the file by users in other groups is not permitted, a method has been employed in which writing of data on the file by the group is permitted and the same by the other user is not permitted, so that the text can be held in common by only the users in the group.

In a case where a batch of texts are prepared by a cooperation of plural persons and other person's writing to each region entrusted to the person in the group is not permitted, the text is sectioned into individual files for each person who charges in it at the time of administrating the text.

In the conventional method, the following operations are performed:

Writing or reading of a file can be permitted to a limited range including the owner of the file, the group and other users.

The conventional method cannot meet a requirement of making a portion entrusted to a person include a portion entrusted to another person to individually control the portions.

Furthermore, the justification of the text is secured by inhibiting writing/reading of the text by a user having no authorization.

Furthermore, the aforesaid controls have been allowed for file units, causing the following problems to arise:

1. In a case where text files, which are being respectively prepared by a plurality of persons, are portions of one text to be prepared in cooperation with one another, the file cannot be integrated and thereby the text cannot be treated collectively.

2. In a case where the file may be reloaded by another person, a desire of confirming the fact that the file has been reloaded if it has been done cannot be met.

3. If the file has been reloaded by a superuser (a user having all rights on any file) or erroneously reloaded by a person permitted to reload it, the fact that the file has been reloaded cannot be confirmed.

SUMMARY OF THE INVENTION

An object of the present invention is to provide a method for discriminating, for each data element, whether or not the content of saved data is justifiable data as it was processed and saved by a justifiable user in a case where the one data element is able to include other data elements so as to detect a fact of reloading if unjustifiable reloading has been performed.

Another object of the present invention is to provide a method of discriminating whether or not the content of saved data is justifiable data as it was processed and saved by a justifiable user, the discrimination being made for each data element while including data element included in a case where the one data element is able to include other data elements so as to detect a fact of reloading if unjustifiable reloading has been performed.

Another object of the present invention is to provide a method in which whether or not the content of saved data is justifiable data as it was processed and saved by a justifiable user is discriminated for each data element while including no included data element in a case where the one data element is able to include other data elements so as to detect a fact of reloading if unjustifiable reloading has been performed.

Another object of the present invention is to provide a method with which an included data element can be selectively treated in a case where whether or not the content of saved data is justifiable data as it was processed and saved by a justifiable user is discriminated for each data element in a case where the one data element is able to, include other data elements and a fact of reloading is detected if unjustifiable reloading has been performed.

According to one aspect, the present invention which achieves these objectives relates to a method of discriminating, for each partial data, whether or not saved data, one file of which is composed of a plurality of partial data items and one partial data which is able to include another partial data, has been unjustifiably reloaded, the method comprising steps of: at the time of saving data, designating partial data; inputting a password; converting the input password and the designated partial data, which includes another partial data item if the designated partial data includes the other partial data item, according to a predetermined procedure to generate a first code; and storing the first code to correspond to the designated partial data; at the time of reading the saved data, designating the partial data; inputting the password; converting the input password and the designated partial data, which includes another partial data item if the designated partial data includes the other partial data item, according to the predetermined procedure to generate a second code; comparing the generated second code with the first code stored to correspond to the designated partial data; and discriminating that the designated partial data has been unjustifiably reloaded if the comparison results in a fact that they are not the same.

According to another aspect, the present invention which achieves these objectives relates to a method of discriminating, for each partial data, whether or not saved data, one file of which is composed of a plurality of partial data items and one partial data of which is able to include another partial data, has been unjustifiably reloaded, the method comprising steps of: at the time of saving data, designating partial data; inputting a password; converting the input password and the designated partial data, from which another partial data item is omitted if the designated partial data includes the other partial data item, according to a predetermined procedure to generate a first code; and storing the first code to correspond to the designated partial data; at the time of reading the saved data, designating the partial data; inputting the password; converting the input password and the designated partial data, from which another partial data item is omitted if the designated partial data includes the other partial data item, according to the predetermined procedure to generate a second code; comparing the generated second code with the first code stored to correspond to the designated partial data; and discriminating that the designated partial data has been unjustifiably reloaded if the comparison results in a fact that they are not the same.

According to another aspect, the present invention which achieves these objectives relates to a method of discriminating, for each partial data, whether or not saved data, one file of which is composed of a plurality of partial data items which are distinguished from each other by punctuation information and one partial data of which is able to include another partial data, has been unjustifiably reloaded, the method comprising steps of: at the time of saving data, designating partial data; inputting a password; converting the input password and the designated partial data, from which the content of another partial data item is omitted if the designated partial data includes the other partial data item and which includes the punctuation information, according to a predetermined procedure to generate a first code; and storing the first code to correspond to the designated partial data; at the time of reading the saved data, designating the partial data; inputting the password; converting the input password and the designated partial data, from which the content of another partial data item is omitted if the designated partial data includes the other partial data item and which includes the punctuation information, according to the predetermined procedure to generate a second code; comparing the generated second code with the first code stored to correspond to the designated partial data; and discriminating that the designated partial data has been unjustifiably reloaded if the comparison results in a fact that they are not the same.

According to another aspect, the present invention which achieves these objectives relates to a method of discriminating, for each partial data, whether or not saved data, one file of which is composed of a plurality of partial data items which are distinguished from each other by punctuation information and one partial data of which is able to include another partial data, has been unjustifiably reloaded, the method comprising steps of: at the time of saving data, designating partial data; inputting a password; converting the input password and the designated partial data, which is processed in accordance with a selected processing method if the designated partial data includes another partial data item, according to a predetermined procedure to generate a first code; and storing the first code to correspond to the designated partial data; at the time of reading the saved data designating the partial data; inputting the password; converting the input password and the designated partial data, which is processed in accordance with a selected processing method if the designated partial data includes another partial data item, according to the predetermined procedure to generate a second code; comparing the generated second code with the first code stored to correspond to the designated partial data; and discriminating that the designated partial data has been unjustifiably reloaded if the comparison results in a fact that they are not the same.

According to another aspect, the present invention which achieves these objectives relates to a method of discriminating, for each partial data, whether or not saved data, one file of which is composed of a plurality of partial data items which are distinguished from each other by punctuation information and one partial data of which is able to include another partial data, has been unjustifiably reloaded, the method comprising steps of: at the time of saving data, designating partial data; inputting a password; in a case where the designated partial data includes another partial data, referring to control information about the included partial data; converting the input password and the designated partial data, which is processed in accordance with the control information if the designated partial data includes the other partial data item, according to a predetermined procedure to generate a first code; and storing the first code to correspond to the designated partial data; at the time of reading the saved data, designating the partial data; inputting the password; in a case where the designated partial data includes the partial data, referring to control information about the included partial data; converting the input password and the designated partial data, which is processed in accordance with the control information if the designated partial data includes the other partial data item, according to the predetermined procedure to generate a second code; comparing the generated second code with the first code stored to correspond to the designated partial data; and discriminating that the designated partial data has been unjustifiably reloaded if the comparison results in a fact that they are not the same.

According to another aspect, the present invention which achieves these objectives relates to a method of discriminating, for each partial data, whether or not saved data, one file of which is composed of a plurality of partial data items which are distinguished from each other by punctuation information and one partial data of which is able to include another partial data, has been unjustifiably reloaded, the method comprising steps of: at the time of saving data, designating partial data; inputting a password; in a case where the designated partial data includes another partial data, referring to a processing method set for the designated partial data; converting the input password and the designated partial data, which is obtained by processing the partial data by the processing method if the designated partial data includes the other partial data item, according to a predetermined procedure to generate a first code; and storing the first code to correspond to the designated partial data; at the time of reading the saved data, designating the partial data; inputting the password; in a case where the designated partial data includes the partial data, referring to a processing method set for the designated partial data; converting the input password and the designated partial data, which is obtained by processing the partial data by the processing method if the designated partial data includes the other partial data item, according to the predetermined procedure to generate a second code; comparing the generated second code with the first code stored to correspond to the designated partial data; and discriminating that the designated partial data has been unjustifiably reloaded if the comparison results in a fact that they are not the same.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 illustrates an example of text data according to a first embodiment of the present invention;

FIG. 9 illustrates an example of an extracted character train according to the first embodiment of the present invention;

FIG. 10 illustrates an example of text data having a justification identification code according to the first embodiment of the present invention;

FIG. 15 illustrates an example of text data according to the second embodiment of the present invention;

FIG. 17 illustrates an example of text data having a justification identification code according to the second embodiment of the present invention;

FIG. 20 illustrates an example of an extracted character train according to a fourth embodiment of the present invention;

FIG. 23 illustrates an example of an extracted character train according to a sixth embodiment of the present invention;

FIG. 24 illustrates an example of text data according to a seventh embodiment of the present invention;

FIG. 27 illustrates an example of text data having a justification identification code according to the seventh embodiment of the present invention;

FIG. 29 illustrates an example of text data according to an eighth embodiment of the present invention;

FIGS. 30A, 30B, 31A and 31B illustrate examples of extracted character trains according to the seventh embodiment of the present invention;

FIG. 32 illustrates an example of text data having a justification identification code according to the eighth embodiment of the present invention;

FIG. 33 illustrates an example of a table showing the correspondence between a text element and an author;

FIGS. 34A and 34B illustrate examples of extracted character trains according to a ninth embodiment of the present invention;

FIG. 36 illustrates an example of text data according to a tenth embodiment of the present invention;

FIG. 41 illustrates an example of extracted information data according to the twelfth embodiment of the present invention; and FIG. 42 illustrates an example of text data according to a thirteenth embodiment of the present invention.

DESCRIPTION OF THE PREFERRED EMBODIMENTS

Figure 1:
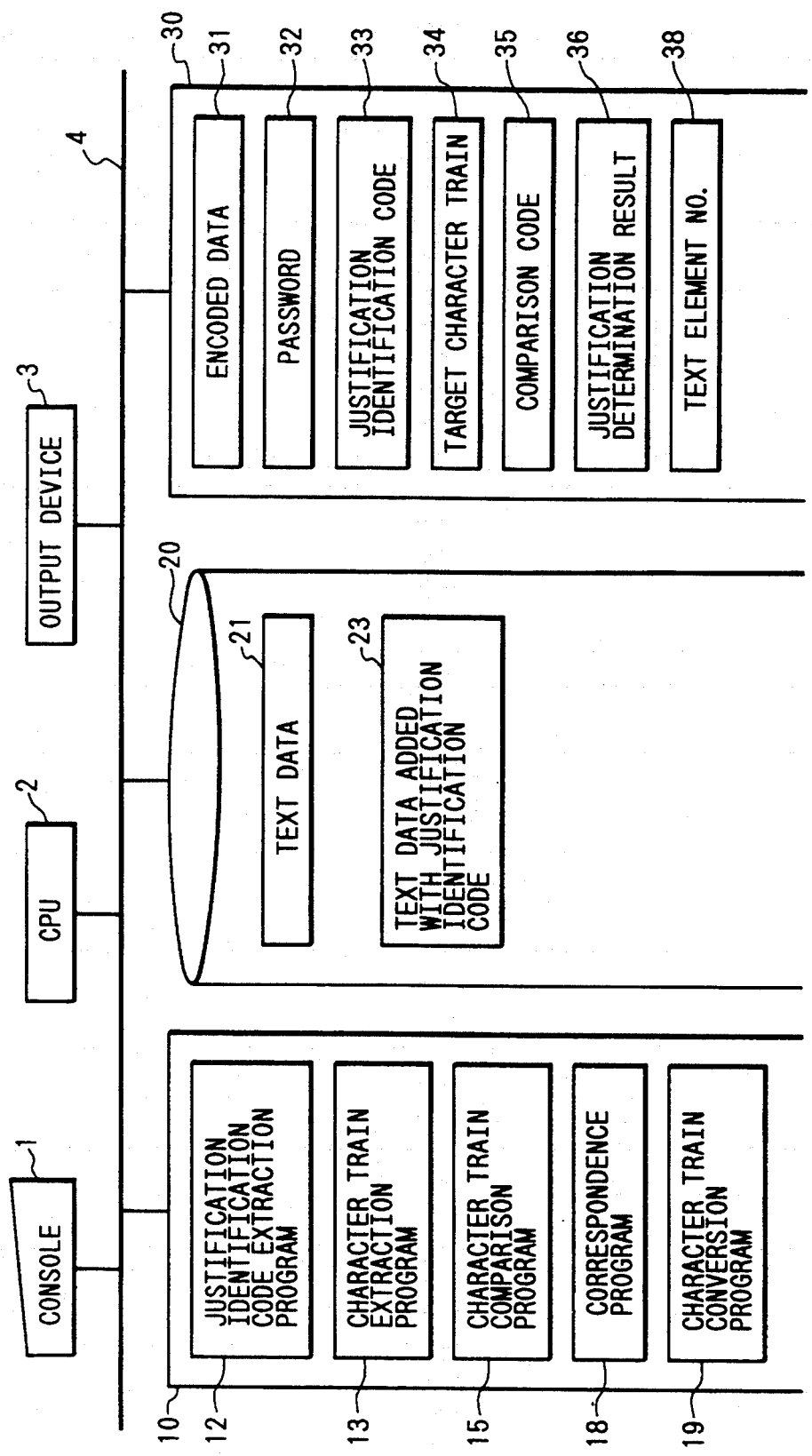
FIG. 1 is a structural view which illustrates a system according to an embodiment of the present invention.

Referring to the drawings, embodiments of the present invention will now be described. According to this embodiment and ensuing embodiments, text data stored in one file is composed of one or more text elements (hereinafter called a "first level text element") and the first level text element includes one or more other text elements (hereinafter called a "second level text element"). At this time, the justification (a fact that the text is not reloaded) of the text for each text element unit is identified according to a code (hereinafter called a "justification identification code") stored to correspond to each of the text elements.

When viewed from the first level text element, the second level text element is called a "sub text element", while the first level text element is called a "main text level" when viewed from the second level text element.

The fact that the text element is "justifiable" means that the contents of the text element are the same as those when the text element is registered. That is, even if the text element had been changed, a discrimination is made that it is a justifiable text element if it has been restored to the original state.

[First Embodiment]

FIG. 1 illustrates the structure of a text processing system according to this embodiment. Referring to FIG. 1, a console 1 is a unit having a device (for example, a keyboard) for inputting information to a computer and a device (for example, a CRT) capable of displaying a response from the computer.

Reference numeral 2 represents a CPU for performing operations according to this embodiment, 3 represents an output device such as a printer or a CRT for printing out or displaying a message from the system.

Reference numeral 10 represents a first storage device for memorizing an operation program to be executed by the CPU 2, 20 represents a second storage device for storing text data to be processed in the system according to this embodiment and 30 represents a third storage device for temporarily storing data for use to perform the operation in the system according to this embodiment.

Although the first, second and the third storage devices may be integrally formed, it is preferable that a program which can be executed by the CPU 2 be operated in the first storage device 10 which may be a RAM comprising an IC chip which reads the program from a floppy disk or, as a general case, a ROM on which the program has been written previously. Since the second storage device stores text data or the like, it is preferable that the second storage device is able to store data even if the power supply is stopped and therefore is a hard disk or a floppy disk.

In the first storage device 10, the following programs are present. Reference numeral 13 represents a character train extraction program for extracting a portion or the overall body of a text element from a text data 21 or a text data 23 having a justification identification code according to the sequential order of appearance in data. Reference numeral 19 represents a character train conversion program for deforming a given character train to convert it into another character train (a justification identification code 33). Reference numeral 18 represents a correspondence program for causing the text element and the justification identification code 33 obtained in the character train conversion program 19 to correspond to each other according to the sequential order and then storing them as text data 23 having the justification identification code. Reference numeral 12 represents a justification identification code extraction program for extracting the justification identification code of the designated text element from the text data 23 having the justification identification code 23 according to the sequential order. Reference numeral 15 represents a character train comparison program for discriminating whether or not two character trains are the same.

The second storage device 20 includes text data 21 composed of a plurality of text elements processed by an author or the like of the text. Reference numeral 23 represents a correspondence program and 18 represents a text data having a justification identification code in which the justification identification code is registered.

The third storage device 30 maintains the following regions. Reference numeral 38 represents a text element number for use to store information denoting the order of the target first level text element. Reference numeral 34 represents a region for storing the character train (hereinafter called a "target character train") extracted from the text data 21 by the character train extraction program 13 and serving as a target of the code generation operation. Reference numeral 32 represents a region for storing a password (hereinafter a "password") supplied by the author of the text through the console 1. Reference numeral 31 represents a region (hereinafter called "encoded data") for storing encoded data processed from the target character train 34 and the password 33. Reference numeral 33 represents a region for storing the justification identification code processed from the encoded data 31 according to the character train conversion program 19. Reference numeral 35 represents a region (hereinafter called a "comparison code") for storing a justification identification code extracted from the text data 23 having the justification identification code according to the justification identification code extraction program 12. Reference numeral 36 represents a region for storing the result of the discrimination made by a character train comparison program 15.

Figure 8:
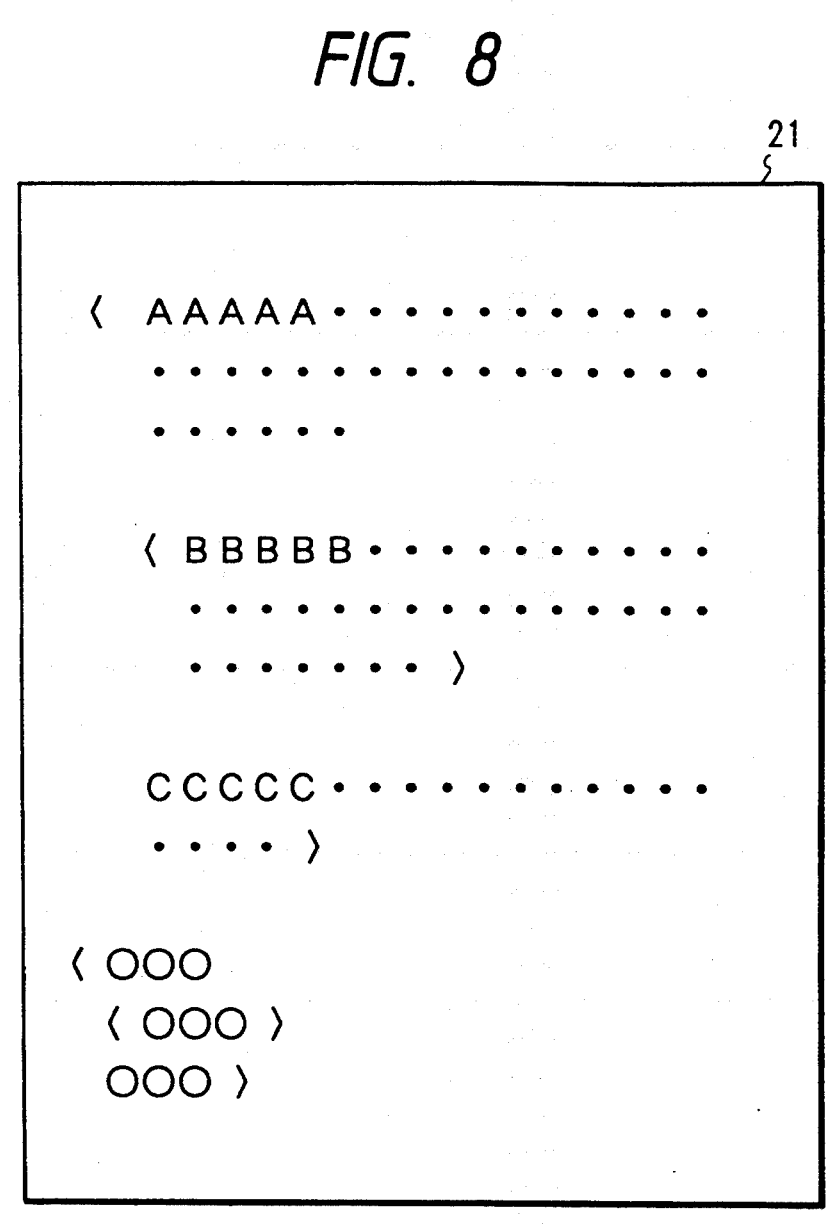

An example of the text data 21 thus-formed and according to this embodiment is shown in FIG. 8.

The text data 21 can be clearly divided for each text element with a certain specific text punctuation mark.

An assumption is made here that each text element is a character train starting from a character "<" and ended at ">" (a pair is formed without exception). Furthermore, uses of "<" and ">" to indicate another meaning except for the punctuation are inhibited to be written in one text (or in one text element).

Then, the flow of the process according to this embodiment will now be described.

The flow is mainly sectioned into two portions, that is a process for preparing a text and a process for identifying the justification.

<Text Preparing Process>

First, a process of registering the justification identification code for a text prepared by a plurality of persons will now be described with reference to a flow chart shown in FIG. 2.

First, an author of the text inputs, through the console 1, a portion (for example, the file name) in which the text data 21, which is the target of the process, is stored and a portion in which the text data 23 having the justification identification code which is the result of the process according to this embodiment is stored. Then, the author specifies the target of the text processing operation (step S201). An assumption is made here that the text data 21 is previously processed by using an editor or the like and is stored. Then, the author of the text inputs, through the console 1, number n of the target first level text element in the text data 21 (step S202) to make it the target text element number 38.

Then, the target character train is extracted from the text data 21 by using the character train extraction program 13 to make it the target character train 34 (step S203 and to be described later).

Furthermore, the author or the text inputs the password 32 through the console 1 (step S204) and prepares the justification identification code 33 from the target character train 34 extracted in step S203 and the password 32 input in step S204 (step S205 and to be described later).

Finally, the correspondence program 18 is used to perform the process of making the target text element to correspond to the justification identification code 33 (step S206 and to be described later). Thus, the text preparation process is completed.

Then, the target character train extraction process in step S203 will now be described.

Figure 9:
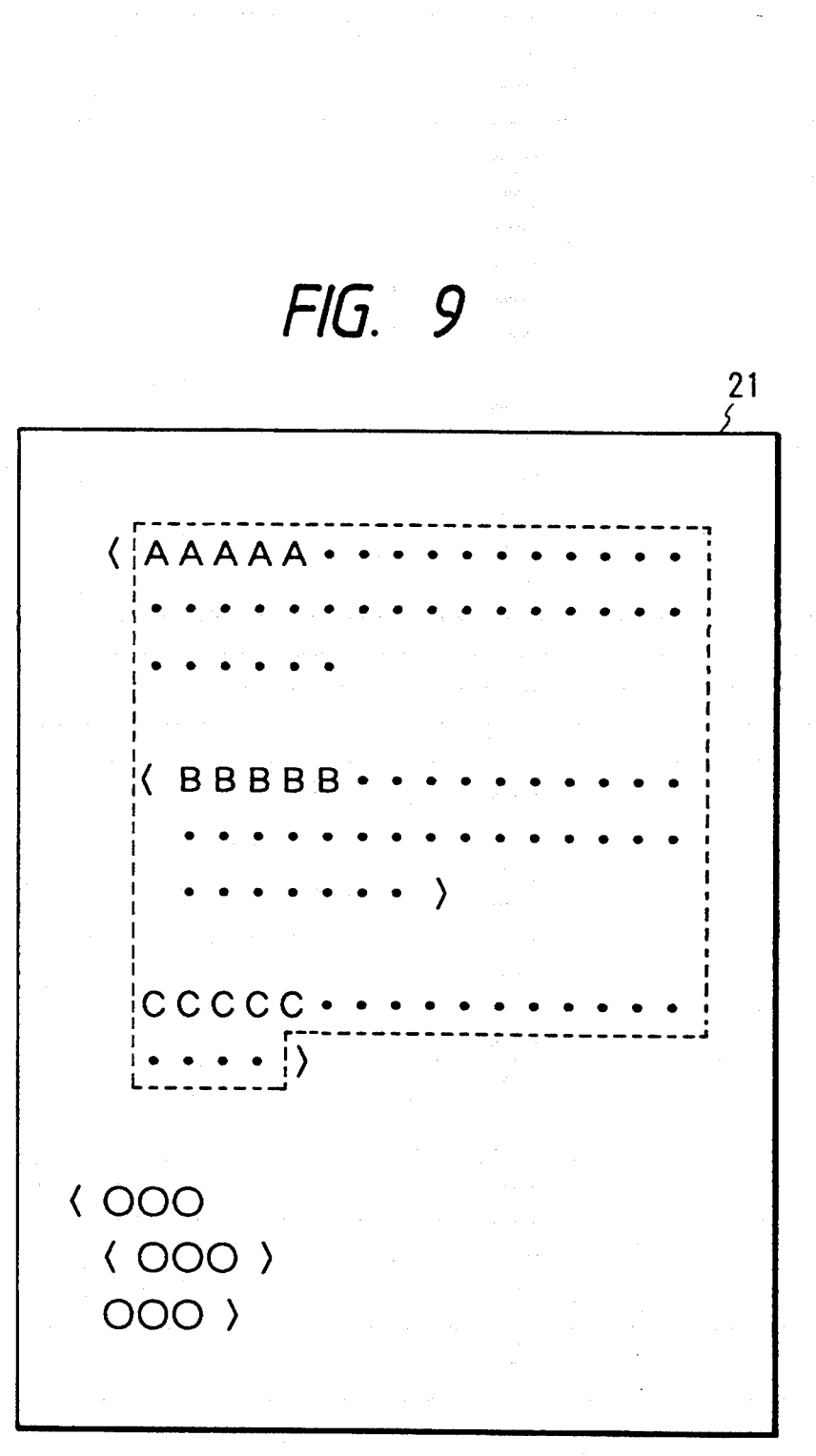

Referring to FIG. 9, a range of the character train to be extracted at the time of preparing encoded data in the text element shown in FIG. 8 is designated by a dashed line.

Then, the contents of this process will now be described according to a flow chart shown in FIG. 3.

First, the identification of the text element will now be described. Each text element is a character train starting at "<" and ended at the corresponding character ">". The "corresponding" relationship is a similar relationship to the correspondence of parentheses in the numerical formula, that is, "<" and ">" form a pair without fail. Namely, "<" serves as an opening parenthesis, while ">" serves as a closing parenthesis. A case where "<" indicating the start of the first level text element is present and "<" appears in a state where corresponding ">" does not appear means the commencement of a second level text element.

Although the description of "a certain order text element" is made, the "n-th text element" is the n-th text element among the first level text elements because only the first level text element is the target here.

In order to extract a desired text element, the start mark "<" for the n-th text element designated by the text element number 38 of the first level text element is detected in the text data 21 (step S301). Since the fact of reaching the end of the text data 21 while detecting no start mark for the n-th text element means that there is no first level text element, the flow proceeds to step S302 in which an error process (a display of a message indicating that there is not target text element or the like) is performed, and the process is completed.

In order to extract the start mark "<" for the n-th first level text element, the start marks "<" must be sequentially detected and counted. At this time, in order to distinguish it from the start mark "<" for the second level text element, the end mark ">" is simultaneously detected and, for example, the following process may be performed.

First, flags which are turned on when the start mark is detected and are turned off when the end mark is detected are provided for the first and the second levels. When the start mark is detected here in a state where the first level flag is turned on (a state in which the start mark for the first level has been detected and the corresponding end mark has not been detected), it is assumed to be the start mark for the second level, and thereby the count of the text element is not updated but the flag for the second level is turned on. The end mark detected in the aforesaid state is discriminated to be the end mark for the second level because the flag for the second level is turned on, and the flag for the second level is turned off. When the end mark is detected in this state, it is discriminated to be the end mark for the first level and the flag for the first level is turned off. Therefore, the next start mark is discriminated to be the start mark for the first level and the count of the text element is increased, so that the start mark for the first level text element and that for the second level text element can be distinguished from each other.

If it has been detected, the character train is scanned from a character after the start mark "<" and the character train before the detected corresponding end mark ">" is stored in the target character train 34 (step S303). Thus, the process in step S203 is completed.

Figure 4:
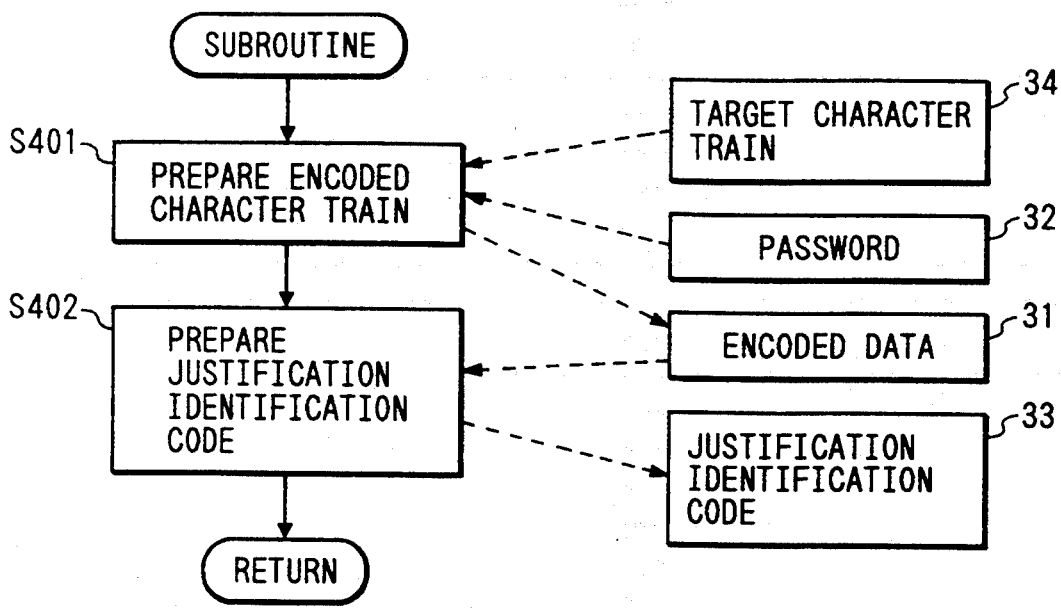
FIG. 4 is a flow chart which illustrates a code generation process.

Then, a code generating process in step S205 will now be described with reference to FIG. 4.

First, the two character trains, that is, the target character train 34 and the password 32 are connected to each other so as to generate the encoded data 31 (step S401). Although an assumption is made that the target character train 34 and the password 32 are character trains, they may be simple byte trains.

Then, the encoded data 31 is converted into another character train by using the character train conversion program 19 so a to store it as the justification identification code 33 (step S402). In a case where the encoded data 31 is the simple byte train, the character train conversion program 19, of course, is a byte train conversion program.

The aforesaid character train conversion program 19 can be realized by an algorithm which is, for example, the same as the process of encoding a password as is done in the UNIX. This process is process in which a certain character train is converted into another character train by a method in which the reverse conversion is inhibited.

If the aforesaid algorithm allows only a character train having a fixed length (for example, 8 bytes) and the encoded data 31 is a character train longer than the fixed length, it may be made the fixed length by the following method.

First, the encoded data 31 is sectioned into each 8 bytes.

Then, the exclusive OR (EX-OR) of them are sequentially obtained (first, the EX-OR of the leading 8 bytes and the next 8 bytes is obtained and the EX-OR of its result and the next 8 bytes is obtained and this is to be repeated in the following). If the residue of the sectioning is shorter than 8 bytes, a process of inserting blanks to become the 8 bytes may be performed.

Thus, a code for 8 bytes can be obtained finally and it is converted into a character code which can be transmitted. At this time, improper codes (a line feeding code, a blank character, "<" and ">") are converted into other proper codes. The character codes are encoded, so that the specific code character train for the text can be obtained. Thus, the process in step S205 can be completed.

Then, the correspondence program 18 in step S206 will now be described. The justification identification code 33 is inserted after the last character of the content of the target first level text element. However, a blank character is inserted between the character which forms the content of the text element and its justification identification code in order to identify them (make them correspond to each other). The insertion of the blank character may be directly input by the author of the text through the console 1 or be automatically made. An example of the automatic insertion will now be described.

Figure 10:
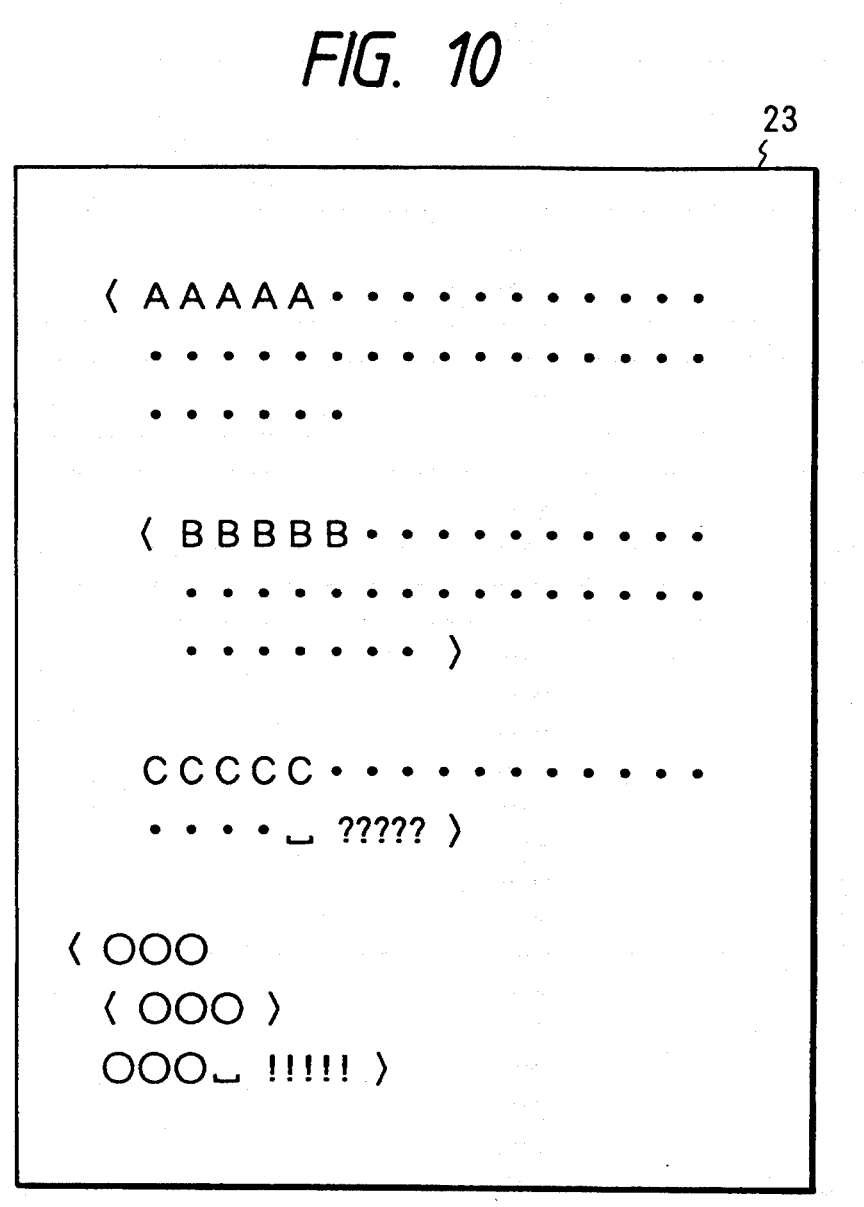

FIG. 10 illustrates an example of the text data 23 having the justification identification code thus generated. Referring to FIG. 10, code "?????" is the justification identifying code for the first text element of the first level and "!!!!!" is the justification identifying code for the second text element of the first level.

Then, the flow of the aforesaid correspondence process will now be described with reference to a flow chart shown in FIG. 5.

First, the (n-th) end mark ">" of the sequential order (n) designated by the text element number 38 is detected from the first level text elements (step S501). Then, the justification identification code 33 is, together with a blank character, inserted to a position just before the end mark ">" (that is, immediate after the content of the first level text element) (step S502) so as to make it to be the text data 23 having the justification identification code. The blank character to be inserted acts to clearly separate the content of the text element from the justification identification code. Thus, the process in step S206 is completed.

In the aforesaid example, the process in step S205 is performed after the processes in steps S203 and 204 have been completed. However, the extracted characters may be sequentially processed according to the character train conversion program 19 while performing the target character train extraction process in step S203.

<Justification Identification Process>

Then, the justification identification process will now be described with reference to a flow chart shown in FIG. 6.

First, the name of the target text data 23 having the justification identification code to be confirmed is input by an author (person who charges in the process) through the console 1 (step S600). Then, the author (person who charges in the process) inputs the number of the target text element through the console 1. The received number of the text element is stored in the text element number 38 (step S601). When the aforesaid input is made, the character train extraction program 13 is executed to extract and store the target text element from the text data 23 having the justification identification code in the target character train 34 (step S602 and to be described later).

Then, the author of the text inputs its password through the console 1. The received password is stored in the password 32 (step S603). Then, encoded data is generated from the target character train 34 taken in step S602 and the password 32 received in step S603 to store it in the encoded data 31. According to data in the encoded data 31, a code is generated by a similar operation to the aforesaid step S205 to store it in the justification identification code 33 (step S604).

Figure 5:
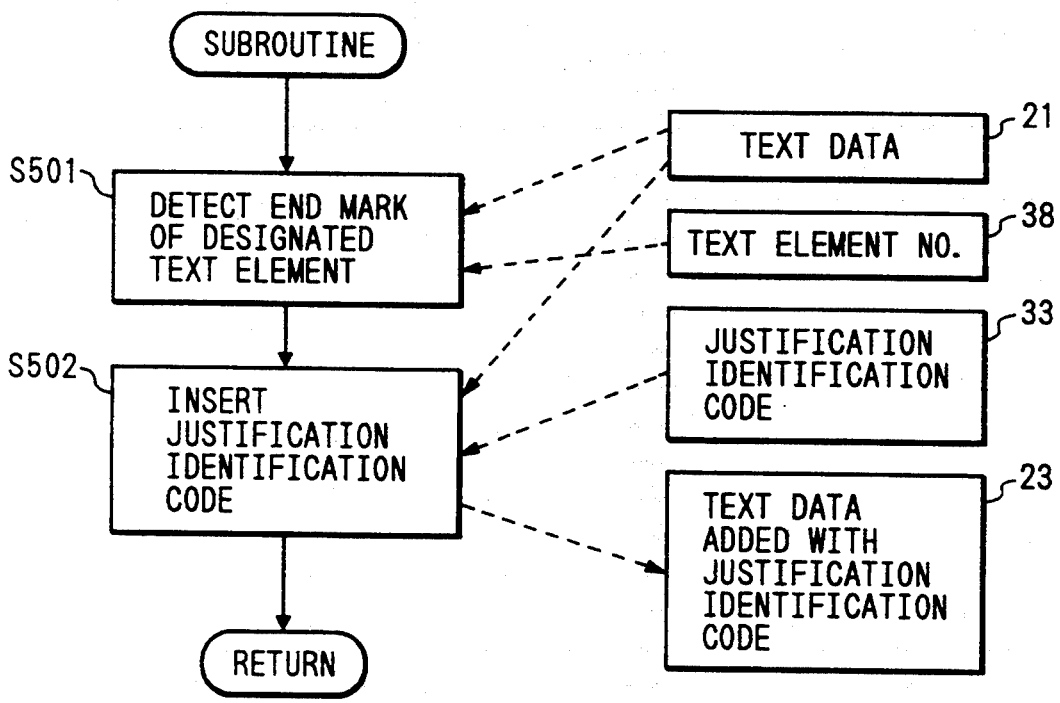
FIG. 5 is a flow chart which illustrates a correspondence process.

Then, the end mark of the n-th text element of the first level designated by the text element number 38 received in step S601 is detected and the character train just before the end mark (which is the justification identification code inserted in step S502 at the time of the preparation shown in FIG. 5 and which is separated from the last character of the content of the text element by the blank character) is extracted to the comparison code 35.

Finally, the justification identification code 33 at the time of the identification and generated in step S604 and the comparison code 35 extracted in step S605 are compared (step S606). If they are the same, the fact that it is a justifiable text is, by, for example, a character train "yes", described in the discrimination result 36 (step S607). If they are not the same, the fact that it is not a justifiable text is, by, for example, a character train "no" in the discrimination result 36 (step S608). Then, the flow returns to the main routine. In the main routine, a message or the like denoting the discrimination result 36 may be displayed at the time of returning from the aforesaid subroutine.

Figure 6:
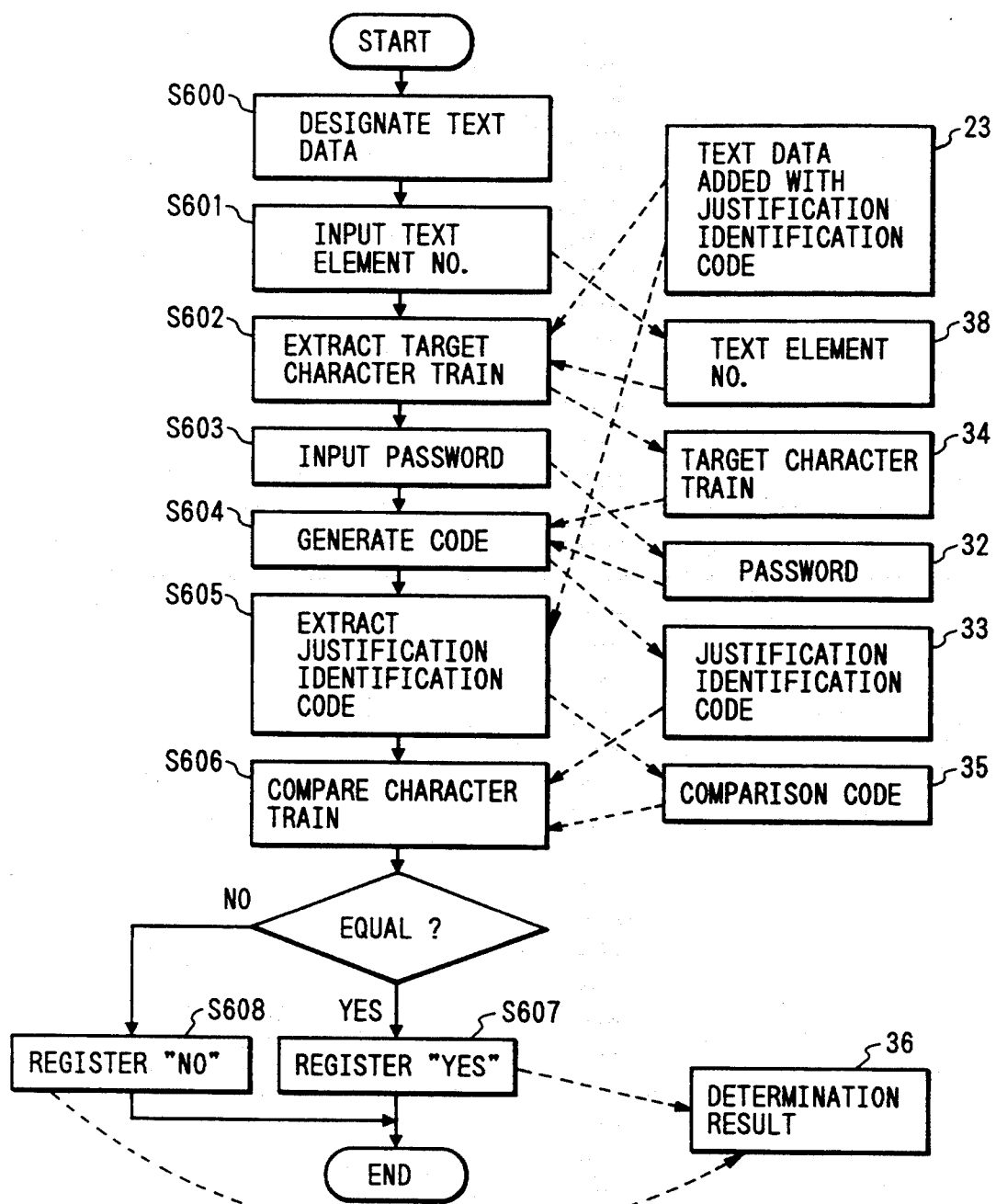
FIG. 6 is a flow chart which illustrates a justification identification process.
Figure 7:
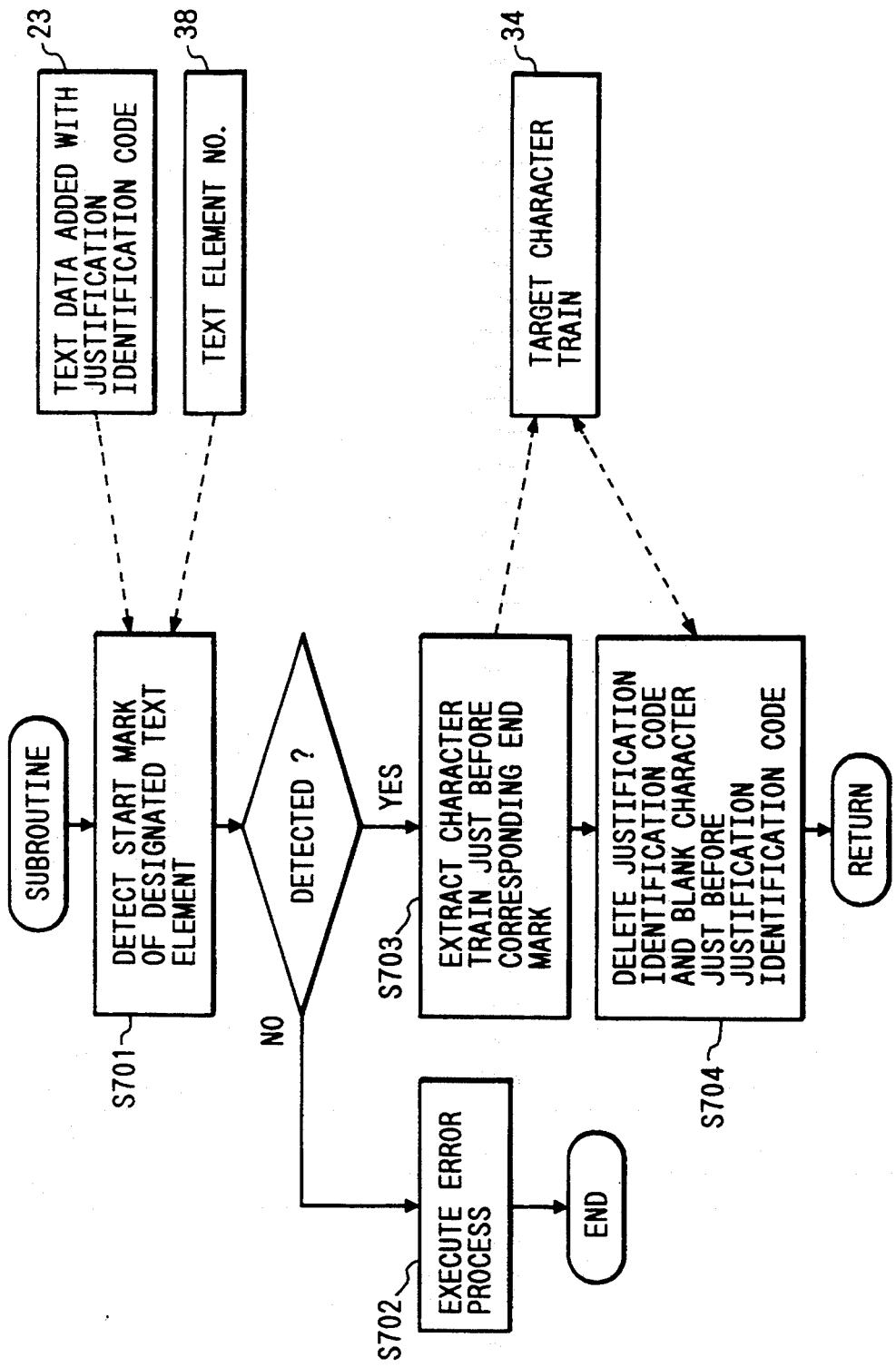
FIG. 7 is a flow chart which illustrates a character train extraction process at the time of the identification process.

The character train extraction process in step S602 shown in FIG. 6 is performed according to a flow chart shown in FIG. 7.

Figure 3:
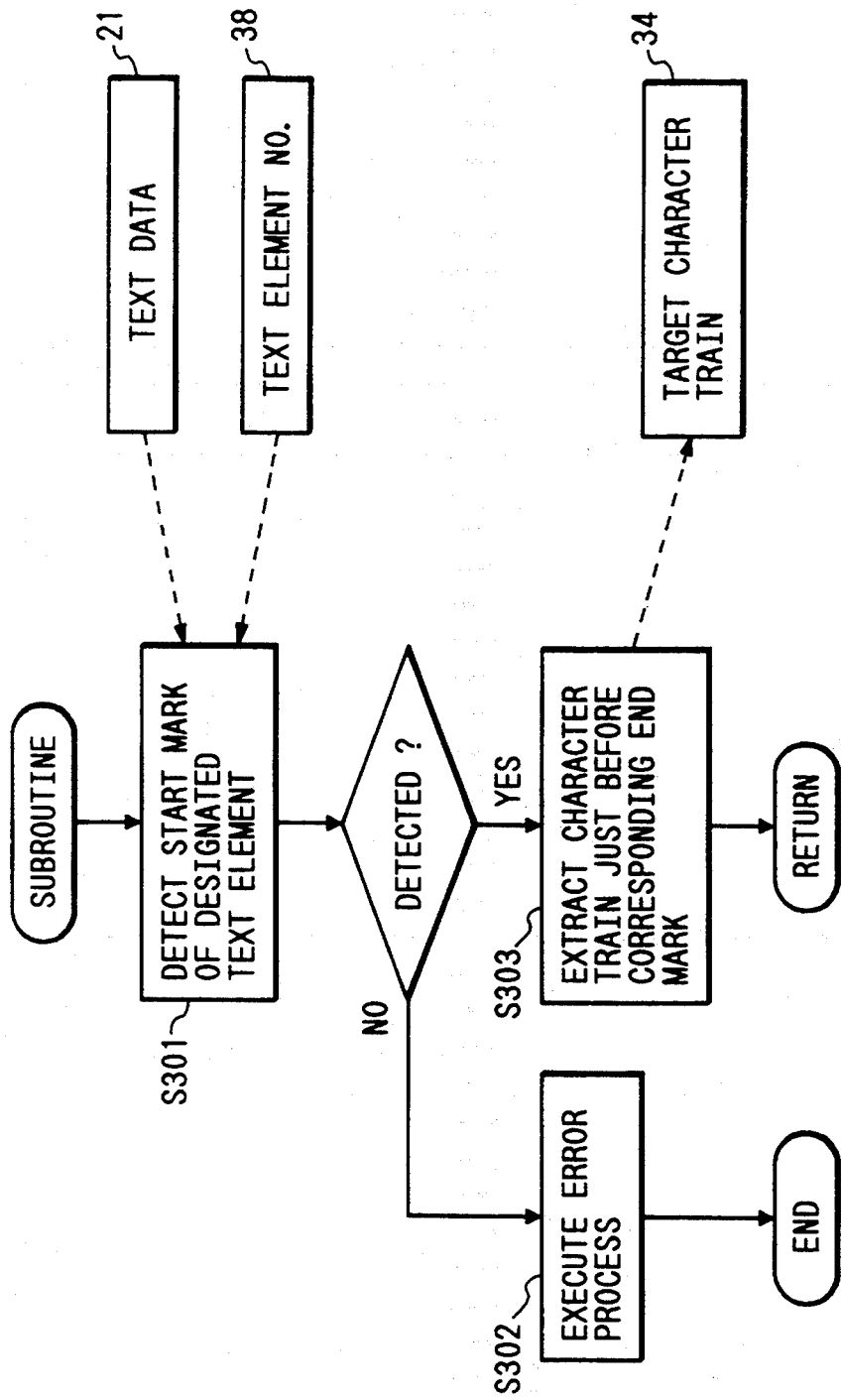
FIG. 3 is a flow chart which illustrates a character train extraction process to be performed at the time of the text preparation.

The processes from step S701 to step S703 are the same as those from step S301 to step S303 shown in FIG. 3. However, the text data 21 is the text data 23 having the justification identification code. That is, the content of the designated text element (the character train immediately after the start mark to just before the corresponding end mark) in the text data 23 having the justification identification code is taken to be stored in the target character train 34. Since the last blank character and ensuing justification identification code are undesirably included in this state, the portions corresponding to those are deleted from data stored in the target character train 34 (step S704).

As an alternative to the aforesaid process (data is temporarily stored and a portion of the stored data is deleted), the process of storing the extracted character train in the target character train 34 may be executed after the last character train and the blank character positioned just before the last character train are deleted. Thus, the process of step S602 is completed.

The code generation in step S604 shown in FIG. 6 is the same operation as that performed in step S205. Therefore, the process is performed similarly to that performed as shown in FIG. 4.

Although one text element is processed in each of the text processing process and the justification identification process, the aforesaid processes may respectively process corresponding text elements. Furthermore, the steps after the designation of the text data may be repeated by the required quantity.

As described above, according to this embodiment, the justification of the text element can be identified simply by designating the text element with the number and inputting the password. For example, in a case where a text, which has been approved in an office, is stored according to the process shown in FIG. 2, whether or not the text has been subjected to an edition such as correction or addition can be detected for each text element.

[Second Embodiment]

Then, a second embodiment of the present invention will now be described with reference to the drawings.

Although text elements are distinguished from one anther depending upon the appearance order in the text according to the aforesaid first embodiment, the second embodiment is arranged in this way that an ID (name) is described in the punctuation mark to name each text element so as to distinguish the text elements from one another.

The structure of the system according to this embodiment is the same as that of the apparatus shown in FIG.

1 except for the program or data stored in the first, second and the third storage devices. Therefore, the drawing for the structure is omitted here. Specifically, the third storage device 30 has a text element name 39 for storing the name of the target text element as an alternative to the text element number 38 shown in FIG. 1. Accordingly, the programs in the storage device 10 and the form of text data in the storage device 20 are partially different from those according to the first embodiment.

Figure 15:
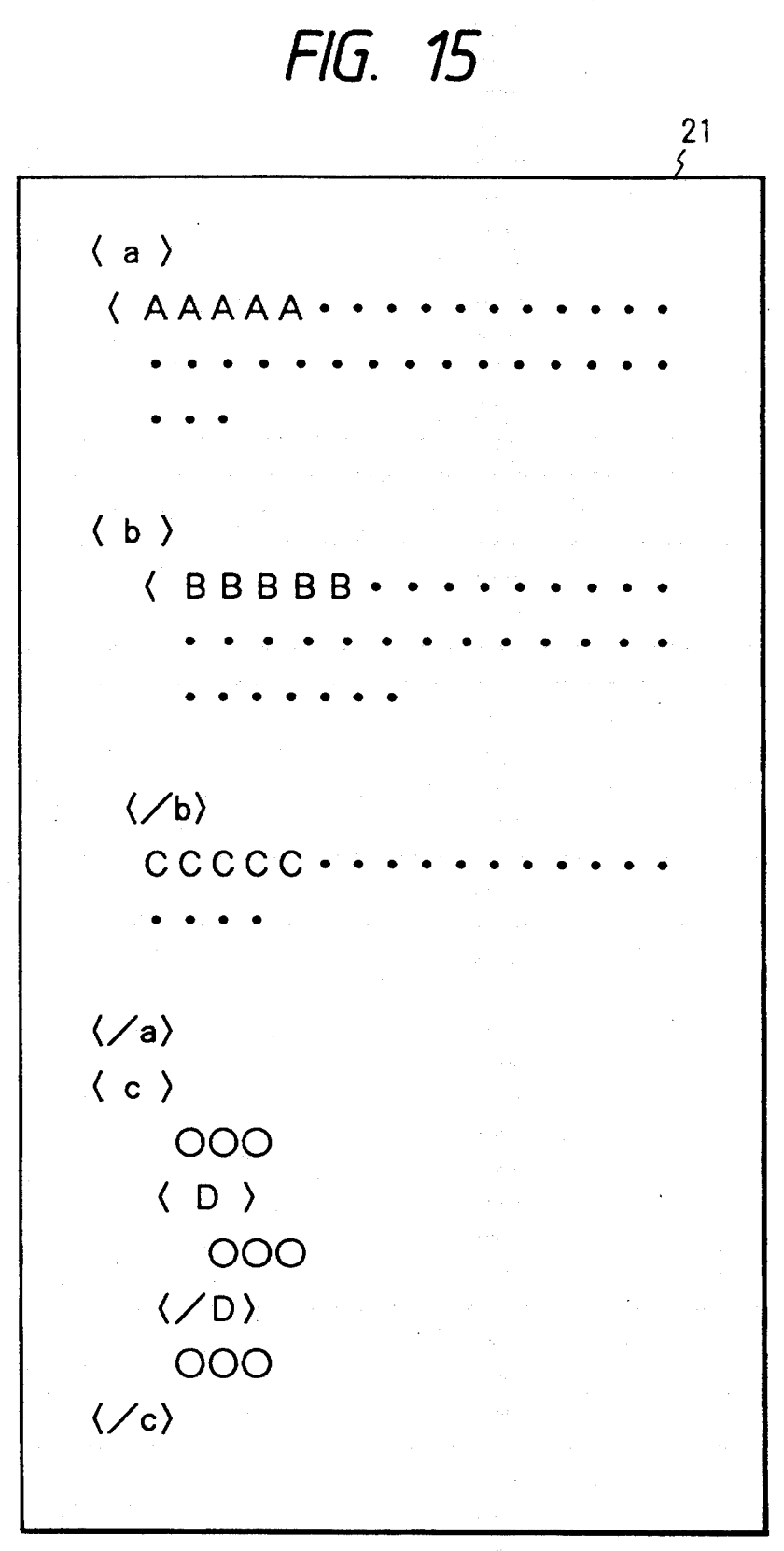

FIG. 15 illustrates an example of text data 21 according to this embodiment.

The text data according to this embodiment can be clearly separated for each text element by specific punctuation marks.

The text punctuation mark starts at character "<" and the same is ended at ">". The name of the text element or the like is described between "<" and ">". Therefore, "<" and ">" must be written for the purpose of using them as only the punctuation marks.

The text punctuations marks are a start mark indicating the start of the text element and an end mark indicating the end of the text element. The end mark is formed by placing "/" just after "<" and other forms correspond to the start mark. Therefore, FIG. 15 shows a case where the first level text element is arranged in this way that the name of the text element is "a", the start mark is "<a >" and the end mark is "</a>". The second level text element is arranged in such a manner that the text element name is "b", and the start mark is therefore "<b>" and the end mark is "</b>".

Then, the flow of the process according to this embodiment will now be described.

Similarly to the first embodiment, the process is composed of a process of preparing a text and a process of identifying the justification.

Figure 11:
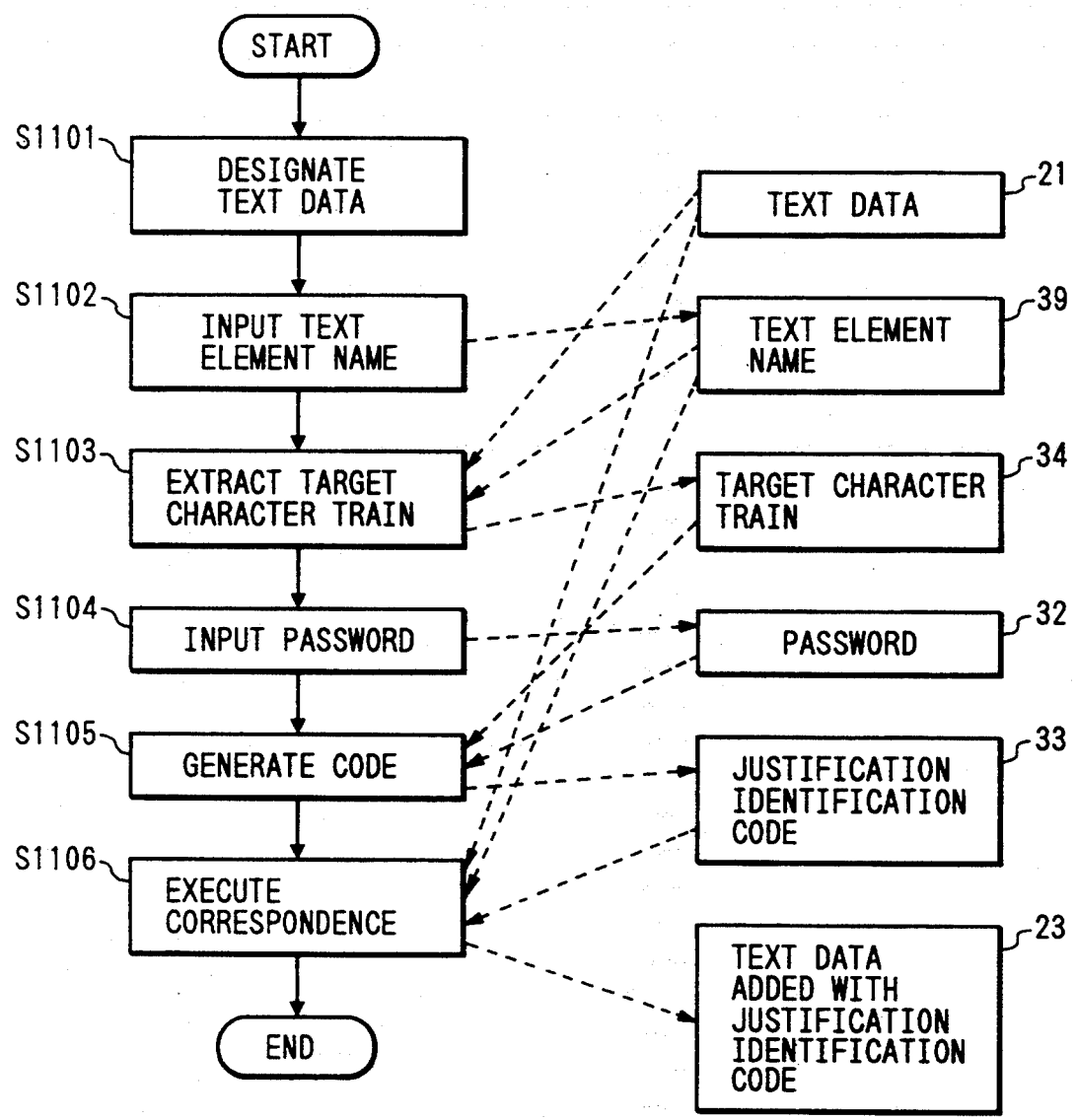
FIG. 11 is a flow chart which illustrates the text preparation and registration process according to a second embodiment of the present invention.

Then, the flow of the text preparation process will now be described with reference to FIG. 11.

Figure 2:
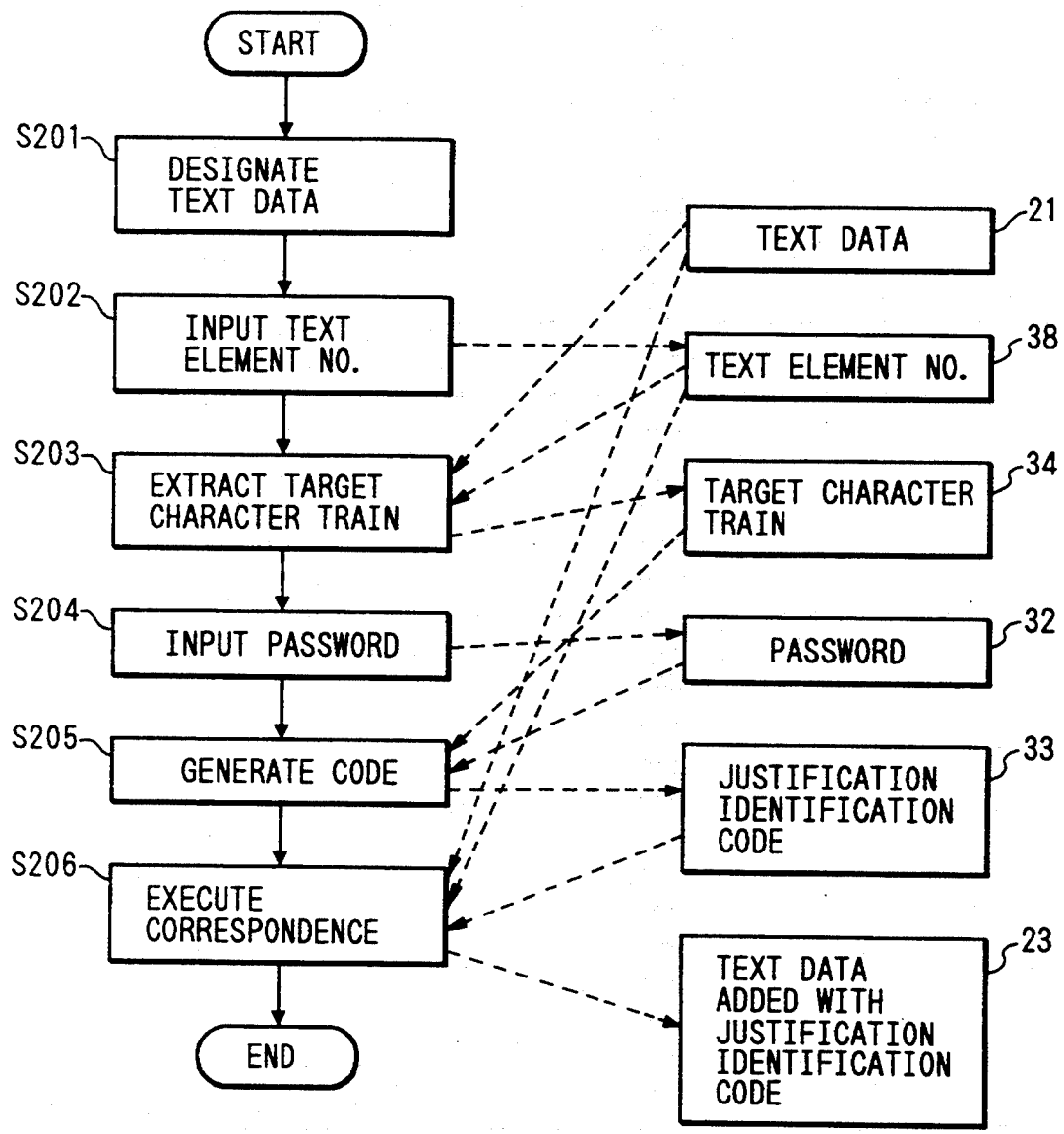
FIG. 2 is a flow chart which illustrates a text preparation and registration processes.

The flow is basically the same as that shown in FIG. 2 except for a novel process of inputting the text element name as step S1102 as an alternative to inputting of the text element number in step S202. Then, the partial difference in the process will now be described.

Then, the character train extraction operation performed in step S1103 shown in FIG. 11 will now be described.

Figure 16:
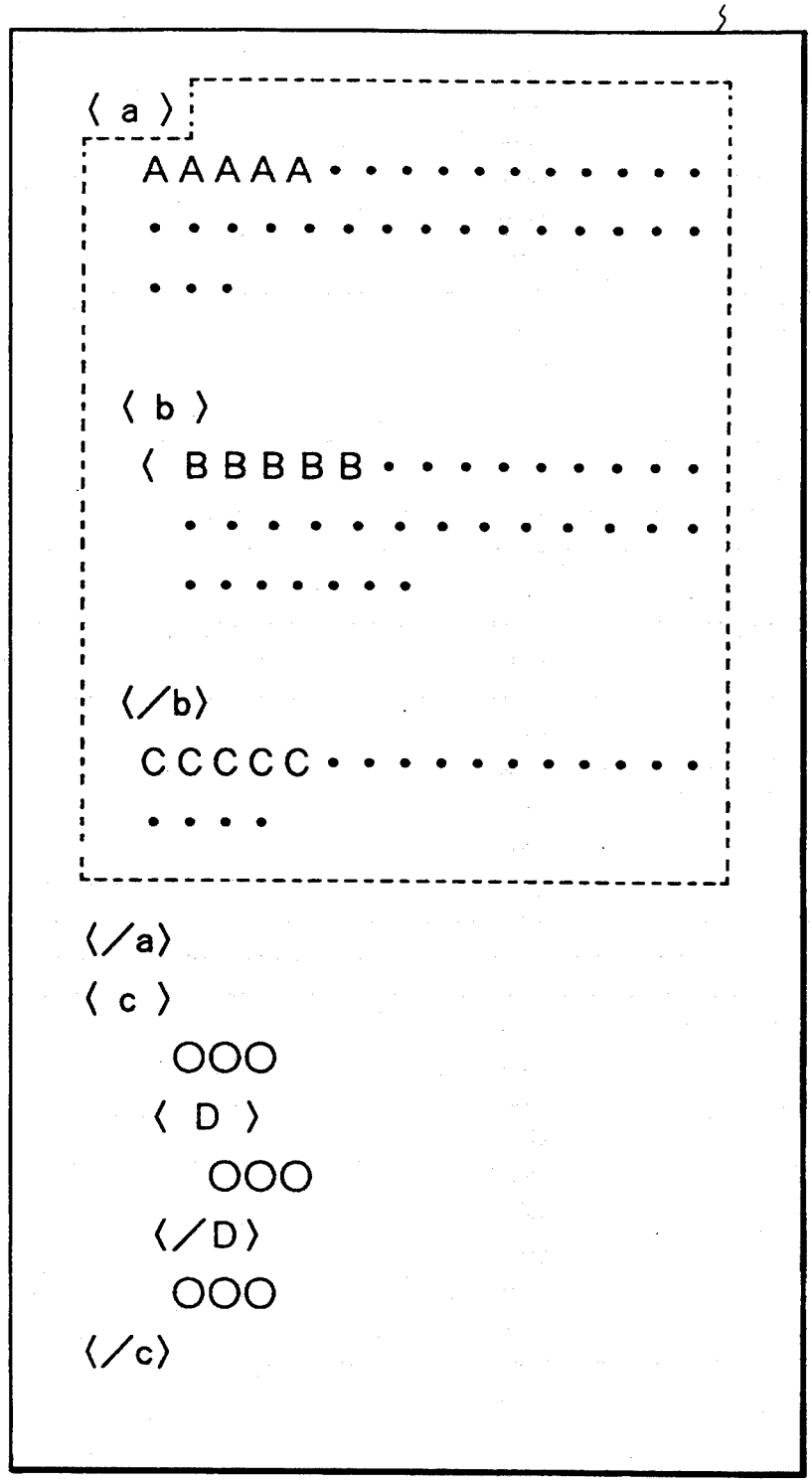
FIG. 16 illustrates an example of the extracted character train according to the second embodiment of the present invention.

FIG. 16, with dashed line, illustrates the range of the character train in the text data 21 for use to prepare the encoded data. That is, the character train starts at the character just after the start mark of the first level text element and is ended at a character just before the corresponding end mark.

First, the start mark for the first level text element having the same text element name as that of the text element name 39 is detected from the text data 21 (step S1201). If the text data 21 is completed while detecting no start mark, a fact that there is no first level text element (step S1202) is displayed (step S1202) and the process is completed as an error operation. If the same is detected at an intermediate portion, a character train from a character positioned just after the start mark to a character positioned just before the corresponding end mark is stored in the target character train 34 (step S1203). Thus, the process in step S1103 is completed.

Then, the correspondence process in step S1106 shown in FIG. 11 will now be described. In this process, the justification identification code 33 is inserted into the end mark for the first level text element so as to make them correspond to each other.

It may be directly input by the author of the text through the console 1 similarly to the first embodiment, then the description will be made about the automatic input.

Figure 17:
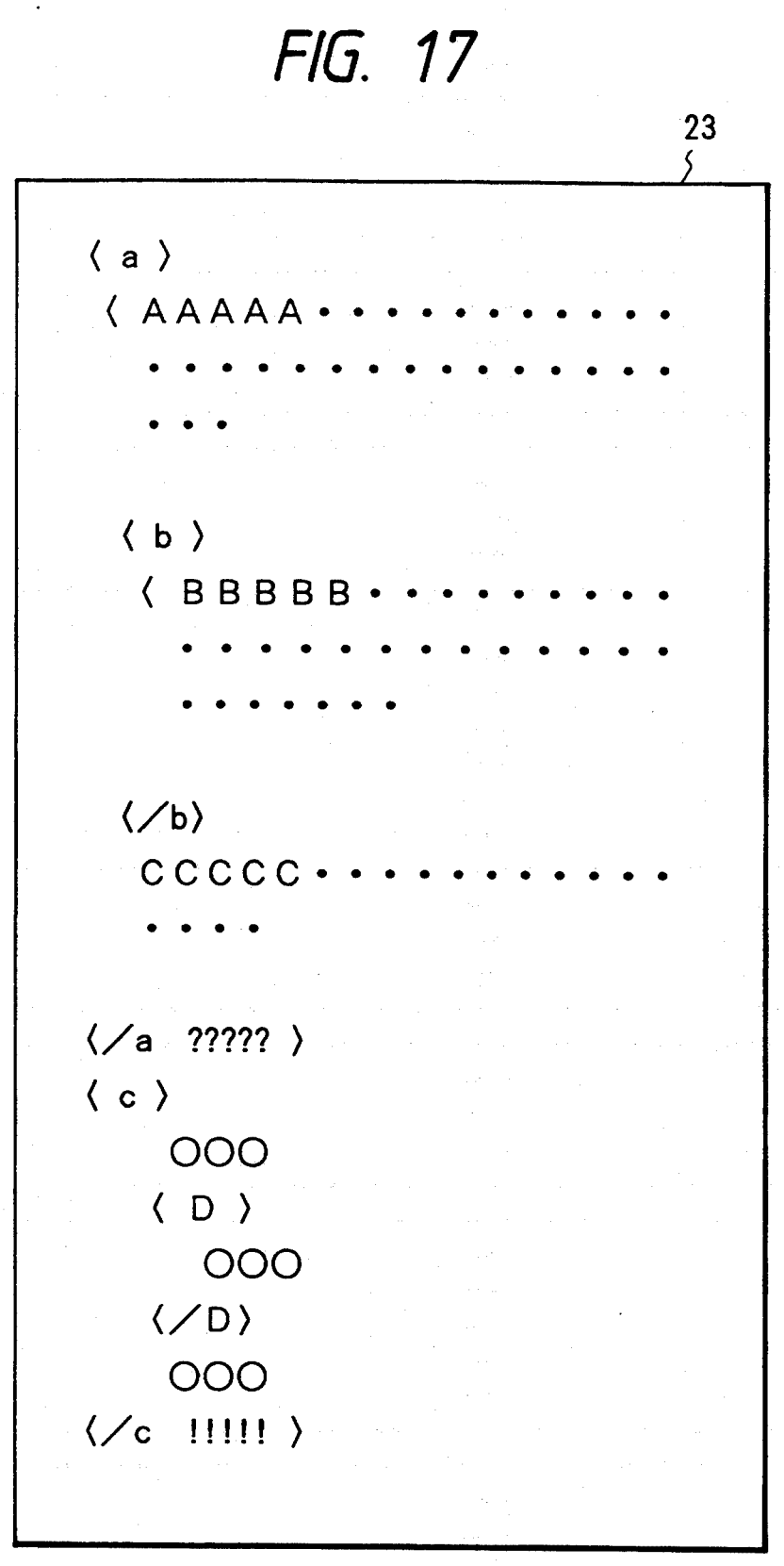

FIG. 17 illustrates an example of the text data 23 having the justification identification code. Referring to FIG. 17, mark "?????" is a justification identification code for the first level text element named "a" and mark "!!!!!" is a justification identification code for a first level text element named "c".

Figure 13:
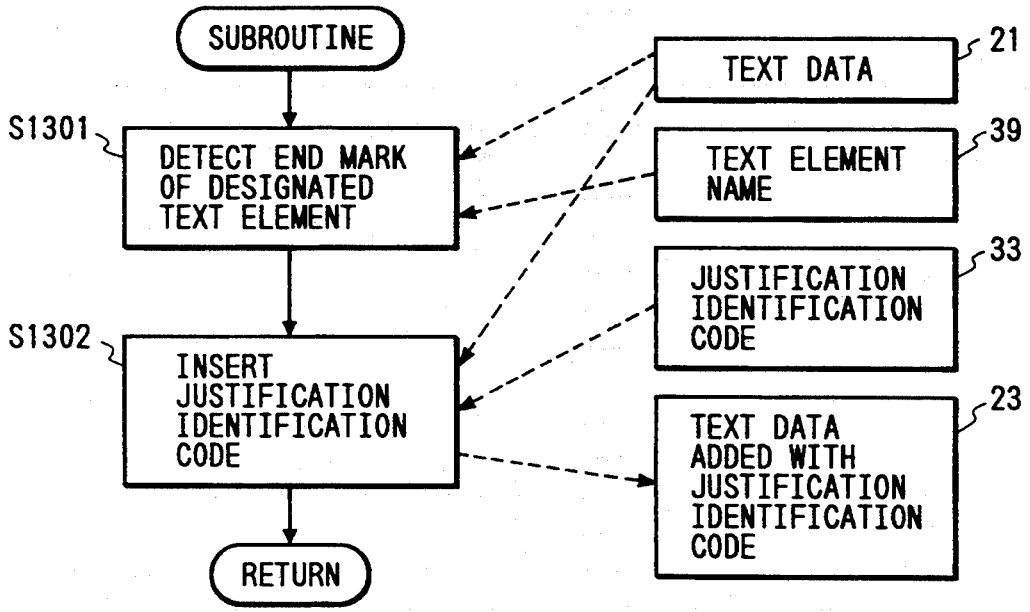
FIG. 13 is a flow chart which illustrates the correspondence process according to the second embodiment of the present invention.

The flow of the process is arranged as shown in FIG. 13.

First, the end mark for the first level text element the name of which is the same as that of the text element name 39 is detected from the text data 21 (step S1301). Then, the justification identification code 33 is inserted to a position after the text element name in the end mark while interposing a blank character (step S1302). By subjecting all of the text elements to the aforesaid process, the text data 21 according to this embodiment becomes the text data 23 having the justification identification code.

Although the registration into the text data 21 is made according to this embodiment, the justification identification code has been already inserted into the end mark in a case where the text data 23 having the justification identification code is changed. Therefore, a process must be performed in which whether or not the justification identification code has been already inserted is confirmed before the aforesaid step S1302, and, if it has been inserted, it is deleted. Thus, the process in step S1106 is completed.

Similarly to the first embodiment, the process in step S1105 is performed after the processes in steps S1103 and S1104 have been completed according to this embodiment. The extracted characters may be sequentially processed according to the character train conversion program 19 while performing the target character train extraction process in step S1103.

Then, the justification identification process will now be described with reference to a flow chart shown in FIG. 14.

First, the portion, in which the text data 23 having the justification identification code which is the target of the identification, is input by the author of the text (person who charges in it) through the console 1 (step S1400). Then, the author of the text inputs the name of the target text element. The received name of the text element is stored in the text element name 39 (step S1401). Then, the character train of the text element which is the target of the identification is extracted from the text data 23 having the justification identification code by using the character train extraction program 13 so as to supply it to the target character train 34 (step S1402).

The author of the text inputs the password which corresponds to the name of the text element which has been previously input through the console 1. The password thus received is stored in the password 32 (step S1403). Then, the target character train 34 taken in step S1402 and the password 32 received in step S1403 are used to generate a code so as to store it in the justification identification code 33 (step S1404). The aforesaid process is the same as the process in step S604 according to the first embodiment shown in FIG. 6. Then, the end mark for the first level text element having the same name as that of the text element name 39 input in step S1401 is detected from the text data 23 having the justification identification code, and the identification code is taken from the aforesaid end mark so as to store it in the comparison code 35 (step S1405).

Finally, the justification identification code 33 processed in step S1404 and the comparison code 35 extracted in step S1405 are compared (step S1406). If they are the same, the fact that it is a justifiable text is, by, for example, a character train "yes", described in the discrimination result 36 (step S1407). If they are not the same, the fact that it is not a justifiable text is, by, for example, a character train "no" described in the discrimination result 36 (step S1408). Thus, the identification process is completed.

Figure 12:
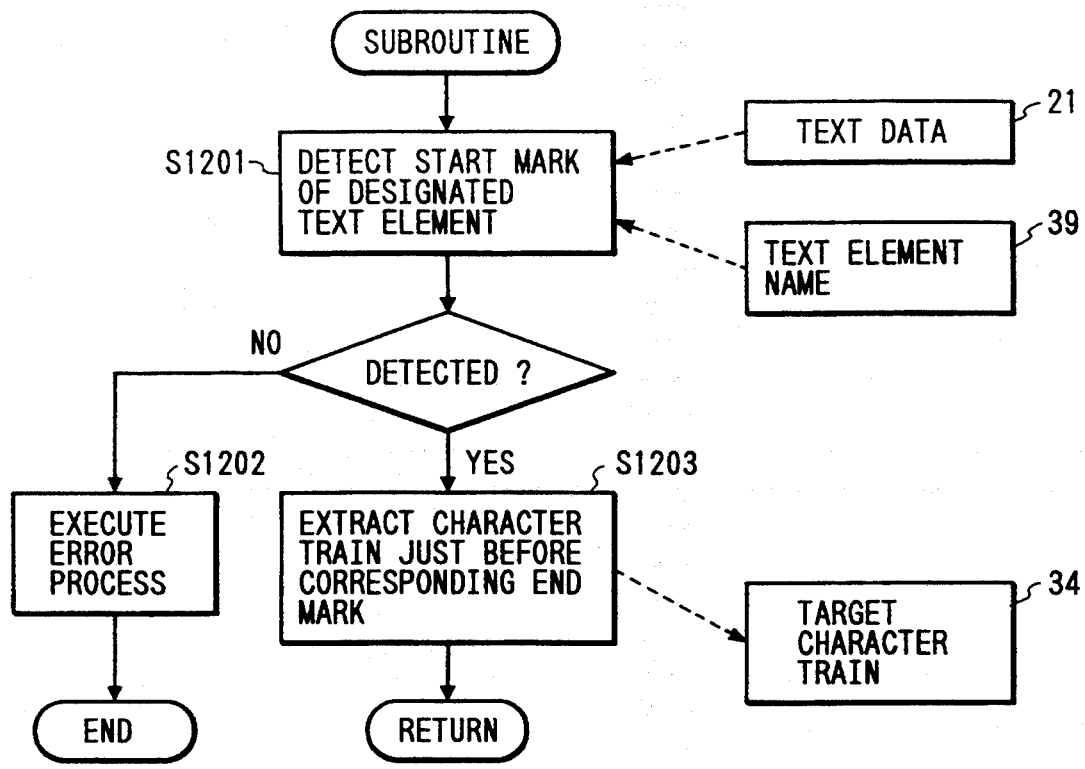
FIG. 12 is a flow chart which illustrates a character train extraction process to be performed at the time of the text preparation according to the second embodiment of the present invention.
Figure 14:
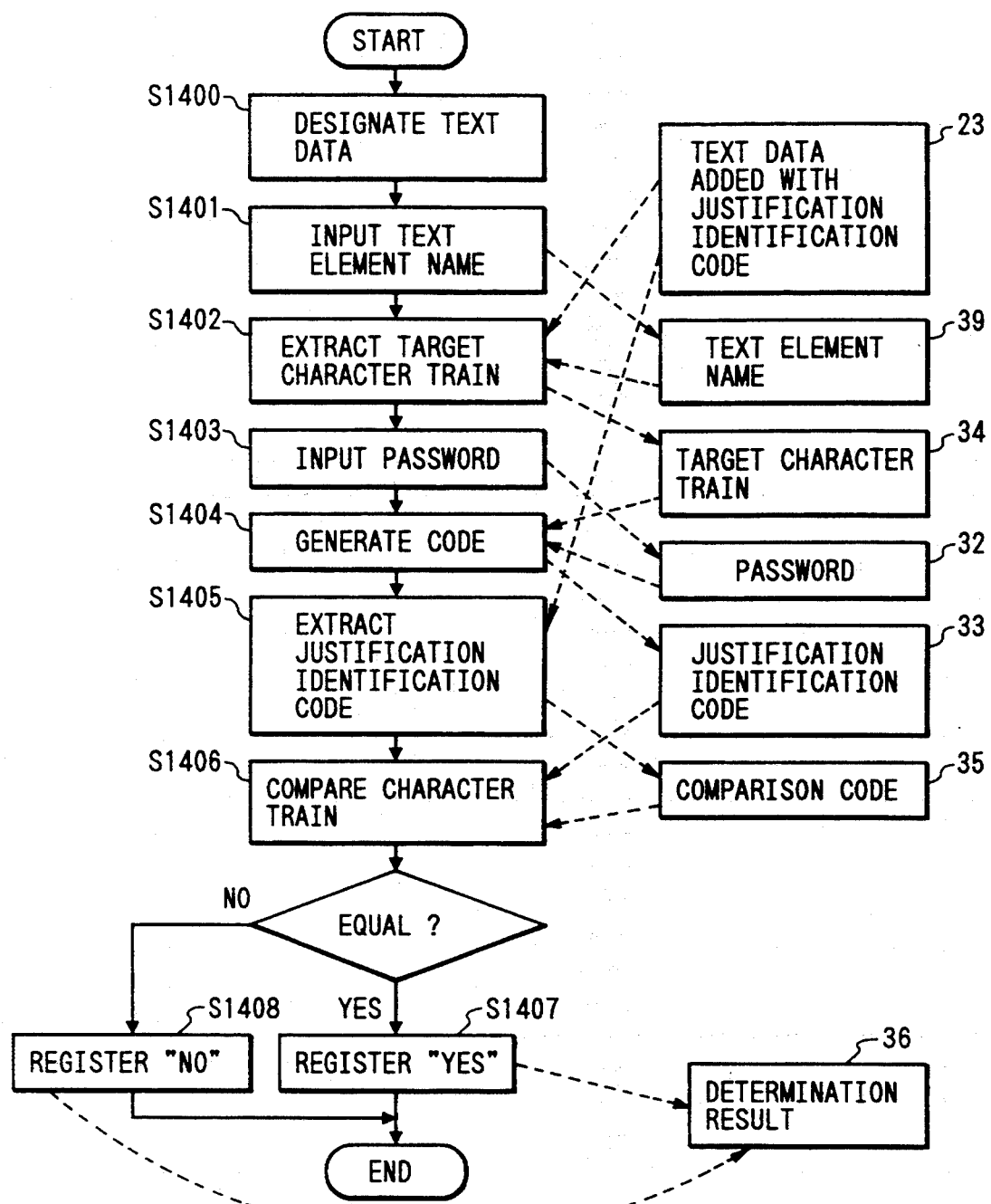
FIG. 14 is a flow chart which illustrates the justification identification process according to the second embodiment of the present invention.

The process to be performed according to the character train extraction program 13 in step S1402 shown in FIG. 14 is the same as that in step S1103. Therefore, it can be described with reference to FIG. 12 while replacing the text data 21 by the text data 23 having the justification identification code.

Although the justification identification code is inserted into the end mark according to this embodiment, it may be inserted into the start mark. Although the text punctuation mark includes only the text element name and the justification identification code, it may include information about attributes and the like. In this case, the text element name and the justification identification code must be clearly distinguished from other information. For example, it might be feasible to employ a method in which it is placed at the second position in the end mark or the type of the attribute is written as "<a owner=nagashima date=1990.9.11 passwd=?-????>. In a case where the position is designated, a dummy justification identification code is inserted into a predetermined position at the time of processing the text data and is replaced by a correct justification identification code at the correspondence process.

As described above, according to the second embodiment, the text element which is the target of the justification identification can be designated with the name of the text element.

[Third Embodiment]

Although also the second level text element included in the designated text element is identified at the time of identifying the justification of the first level text element according to the first and the second embodiments, the included second level text element is omitted from the target of the justification identification according to this embodiment.

According to this embodiment, even if the author of the second level text element is different from the author of the first level text element and it can be changed after the first level text element has been processed, the person who charges in the first level text element is able to identify the justification of it.

Figure 18:
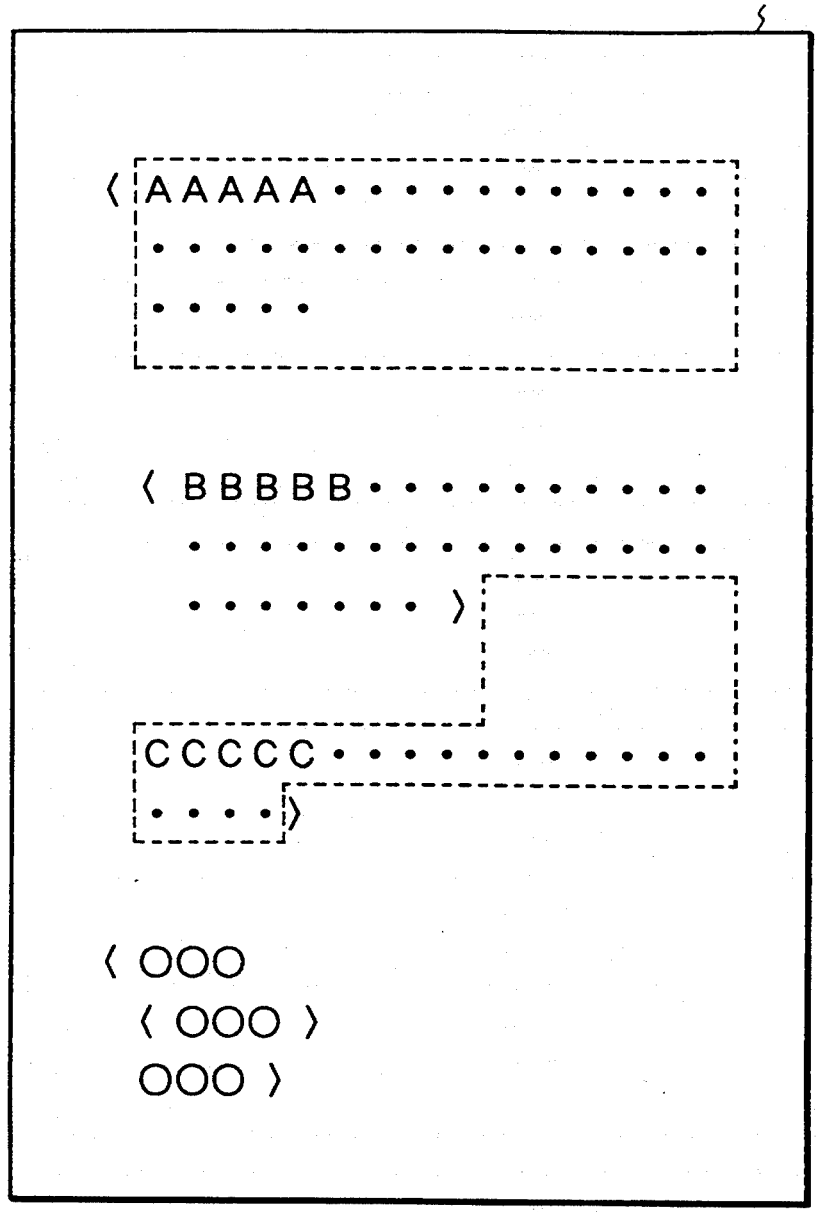
FIG. 18 illustrates an example of an extracted character train according to a third embodiment of the present invention.

The structure of the text processing system according to this embodiment is the same as that according to the first embodiment except for a fact that the target of the extraction of the character train extraction program 13 is different. Also the flow of the process is the same as the flow chart shown in FIG. 2 except for the details of the target character train extraction process in step S203. Referring to the text element shown in FIG. 8 similarly to the first embodiment, the target of the identification operation according to this embodiment is a portion surrounded by a dashed line shown in FIG. 18.

Then, the character train extraction process according to this embodiment will now be described with reference to a flow chart shown in FIG. 19.

Figure 19:
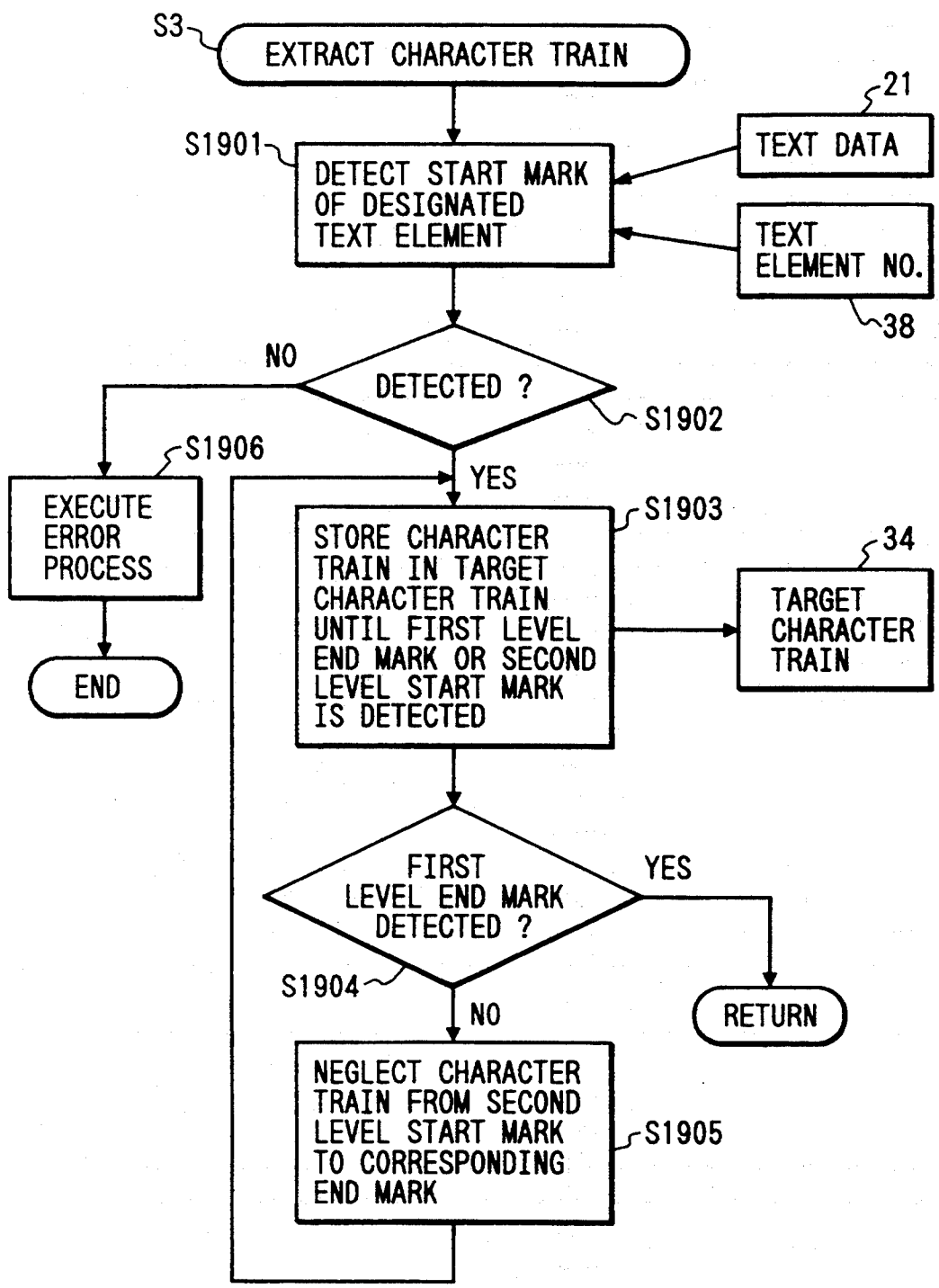
FIG. 19 is a flow chart which illustrates a character train extraction process to be performed at the time of the text preparation according to the third embodiment of the present invention.

First, start mark "<" for the n-th text element of the first level text element is, in step S1901 shown in FIG. 19, detected from the text data 21 according to number n supplied in step S202 shown in FIG. 2. If the text data 21 is completed while detecting no start mark "<" for the n-th text element in step S1902, the flow proceeds to step S1906 in which a display of a fact that there is no target first level text element is made and the process is completed as an erroneous operation.

If the start mark for the n-th text element is detected in step S1902, the flow proceeds to step S1903 in which the character code trains are stored in the target character train 34 until the end mark ">" of the first level text element or the start mark "<" of the second level text element is detected. In step S1904, whether or not the mark detected in step S1903 is the end mark ">" of the first level text element is examined. If it is affirmative, a discrimination is made that the extraction of the designated first level text has been completed and the flow returns to the main routine.

In a case where the mark detected in step S1904 is the start mark "<" of the second level text element, the flow proceeds to step S1905 in which the character code train from the aforesaid start mark to the corresponding end mark ">" of the second level text element is simply read. Then, the flow returns to step S1903 in which the process from step S1903 is continued until the end mark ">" of the first level text element is detected. Thus, the character code train of the first level surrounded by the dashed line shown in FIG. 9 is, as the target character train 34, stored.

Also the identification process according to this embodiment is the performed according to the flow chart shown in FIG. 6 similarly to the first embodiment. The character train extraction process in step S602 is, similarly to the character train extraction process (the flow chart shown in FIG. 19) in the text processing operation, performed while omitting the second level text element. Although the process is arranged substantially similarly to the flow chart shown in FIG. 19, it is necessary that the character train is extracted until the first level end mark is detected and, similarly to step S704 shown in FIG. 7, the justification identification code and the blank character just before it are omitted from the extracted character train.

[Fourth Embodiment]

Although this embodiment is arranged to omit the included second level text element from the target of the justification identification similarly to the third embodiment, the designation of the text element is, similarly to the second embodiment, performed with the text element name in place of the text element number as is done according to the third embodiment.

The structure of the text processing system according to this embodiment is the same as that according to the second embodiment except for a difference in the target of the extraction in the character train extraction program 13. Also the flow of the process is performed according to the flow charts shown in FIGS. 11 and 14 except for the difference in the detailed process of extracting the target character train to be performed in steps S1103 and S1402.

Figure 20:
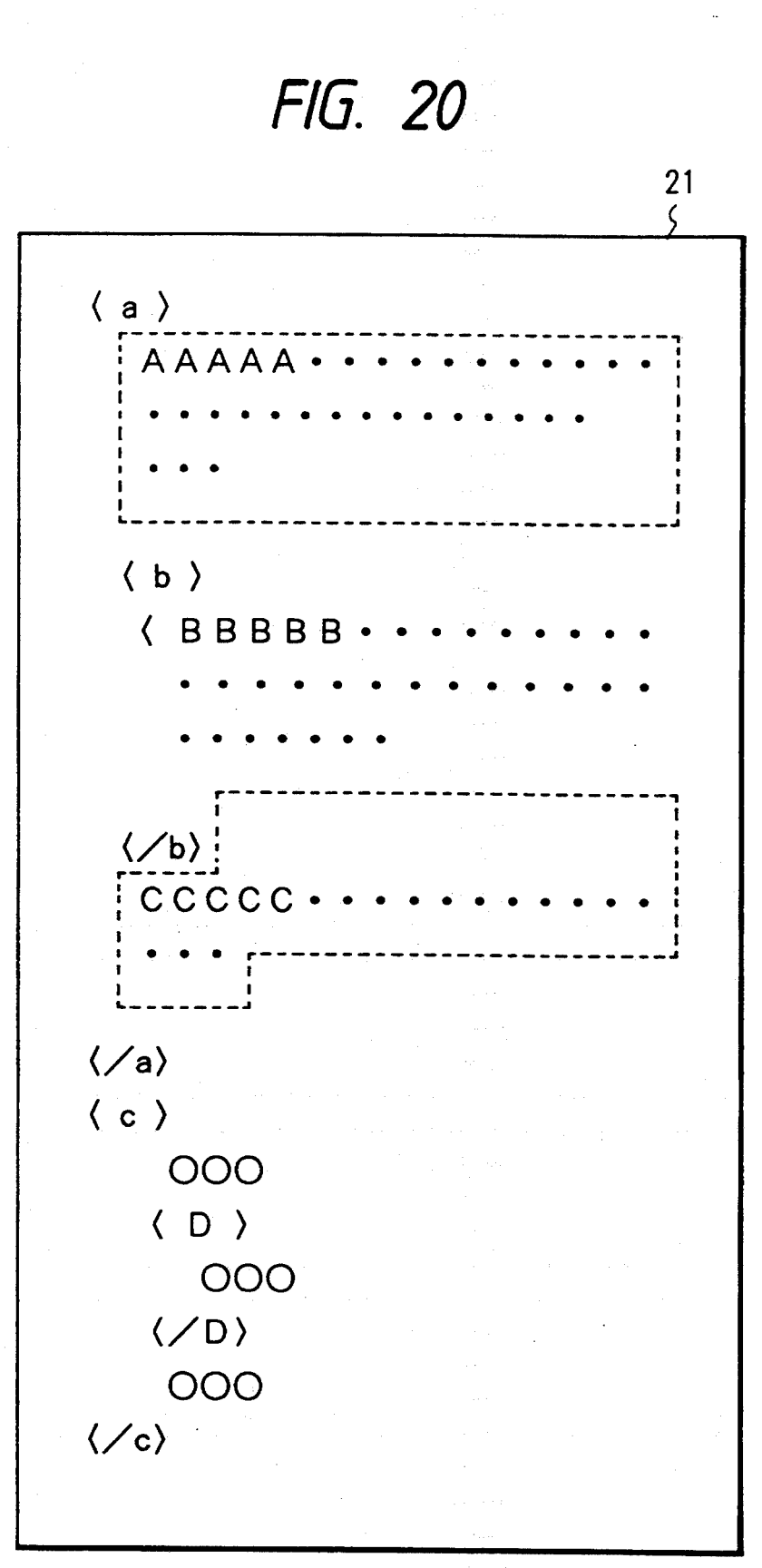

FIG. 20, with dashed line, illustrates a portion of the text element named "a" which is the target of the identification. The aforesaid portion is, as the target character train, extracted in the character train extraction process. Although the character train extraction process according to this embodiment is substantially the same as that according to the third embodiment, the detections of the start mark and the end mark are, similarly to the second embodiment, performed by utilizing the text element name. Since the other portions are the same as those according to the second embodiment, their detailed descriptions are omitted here.

As described above, according to the third and the fourth embodiments, even if text data is sectioned into a certain number of text elements by the text punctuation marks and the text element includes another text element, the justification of only the target text element can be identified. That is, according to this embodiment, the identification code for only the target text element is processed while omitting the position and the contents of the other text element included. Therefore, a discrimination is made that the target text is a justifiable text in a case where the content of the target text element is not changed even if the text element which is not the target of the identification (that is, the other text element included) is reloaded.

Furthermore, even if the text element which is not the target is deleted, if its position is changed or if the text element name or the attribute is changed in a case where the text element, which is not the target, has the text element name or the attribute, the identification of the justification of the text element which is not the target is not affected. Therefore, an effect can be obtained in that the state of only the text element desired to be identified can be detected.

[Fifth Embodiment]

This embodiment is arranged in such a manner that the contents of the second level text element included is omitted from the target of the identification of the first level text element but the punctuation mark is included.

Figure 21:
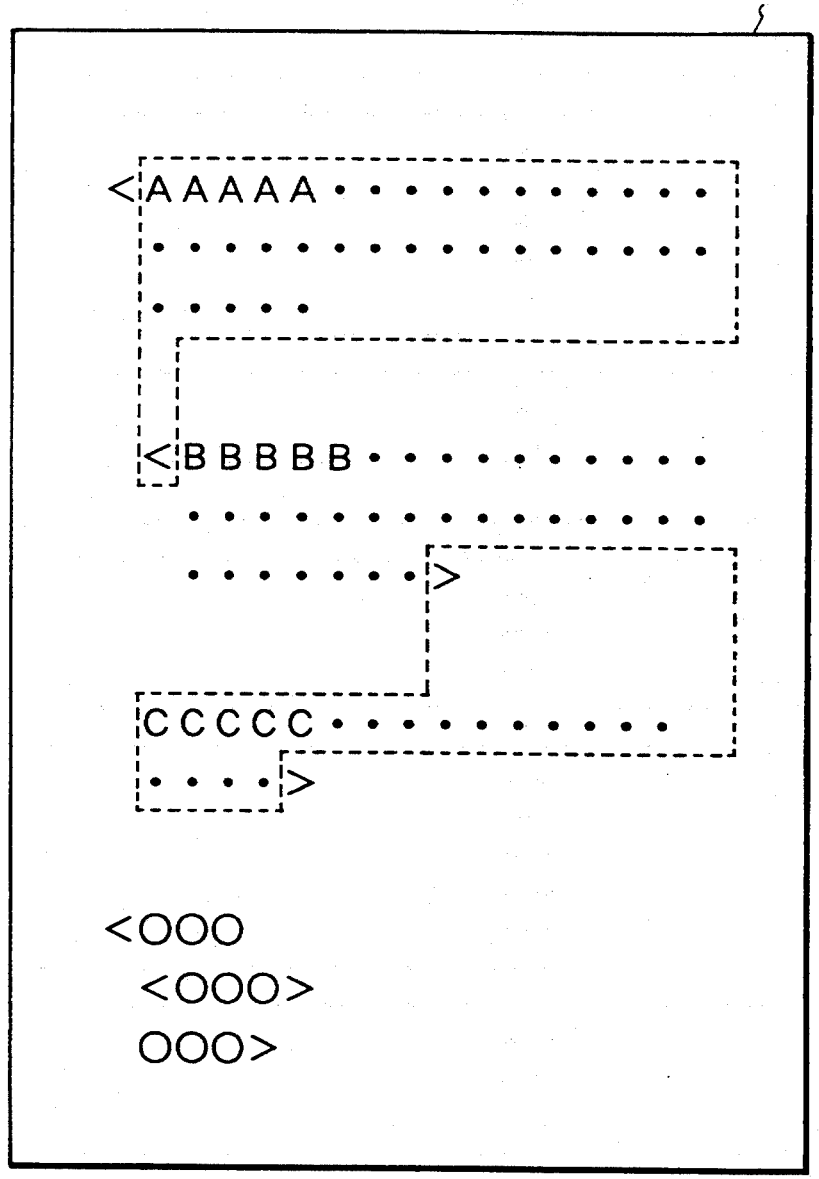
FIG. 21 illustrates an example of an extracted character train according to a fifth embodiment of the present invention.

FIG. 21, with a dashed line, illustrates the range of the character train included in the text data 21 for use at the time of generating the encoded data shown in FIG. 8. According to this embodiment, in a case where the first level text element includes the second level text element, the content of the second level text element is omitted from the content of the first level text element and the punctuation marks for the second level text element are included as illustrated.

Figure 22:
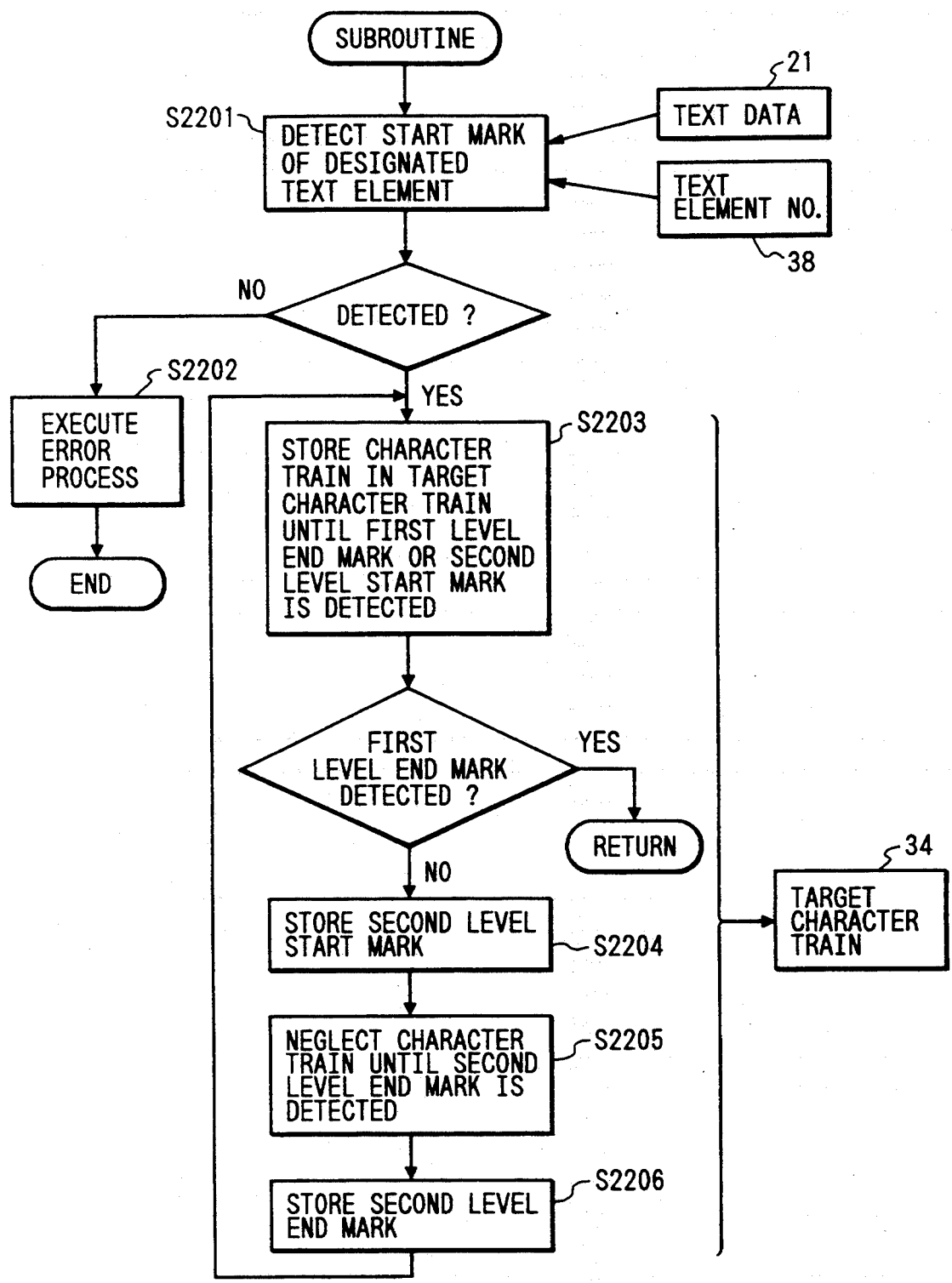
FIG. 22 is a flow chart which illustrates a character train extraction process to be performed at the time of the text preparation according to the fifth embodiment of the present invention.

Then, the contents of the process according to this embodiment will now be described with reference to a flow chart shown in FIG. 22.

First, start mark "<" of the n-th text element of the first level text elements designated by the text element number 38 is detected in the text data 21 (step S2201). If the detection reaches the end portion of the text data 21 while detecting no mark, it can be considered that there is no target first level text element and therefore the flow proceeds to step S2202 in which an error process (a message indicating a fact that there is no target text element is displayed or the like) and the process is ended.

If the same is detected, the detection is made sequentially from the character positioned next to the start mark "<" until the end mark of the first level text element or the start mark of the second level text element is detected and the aforesaid characters are sequentially added (stored) to the target character train 34 at the time of the preparation (step S2203). In a case where the detected mark is the end mark for the first level text element, the character train extraction process is ended because the character train designated by a dashed line shown in FIG. 22 has been stored.

In a case where a discrimination is made that the detected character is the start mark for the second level text element, the start mark is added to the target character train 34 (step S2204) and the character train to the corresponding end mark for the second level text element is simply read while being not stored (step S2205). When the end mark for the second level text element is detected, this end mark is added to the target character train 34 (step S2206) and the flow returns to step S2203.

As a result, the character train from which the content of the second level text element is omitted from the first level text element and which includes the punctuation marks can be extracted in the target character train 34.

Also the target character train extraction at the time of the identification is similarly performed. Since the other processes are substantially the same as those according to the first and the third embodiments, their descriptions are omitted here.

[Sixth Embodiment]

This embodiment is arranged in this way that the content of the included second level text element is omitted as the target of the identification of the first level text element but the punctuation marks are included. Furthermore, the text element is designated by the text element name similarly to the second embodiment in place of the text element number according to the fifth embodiment.

Figure 23:
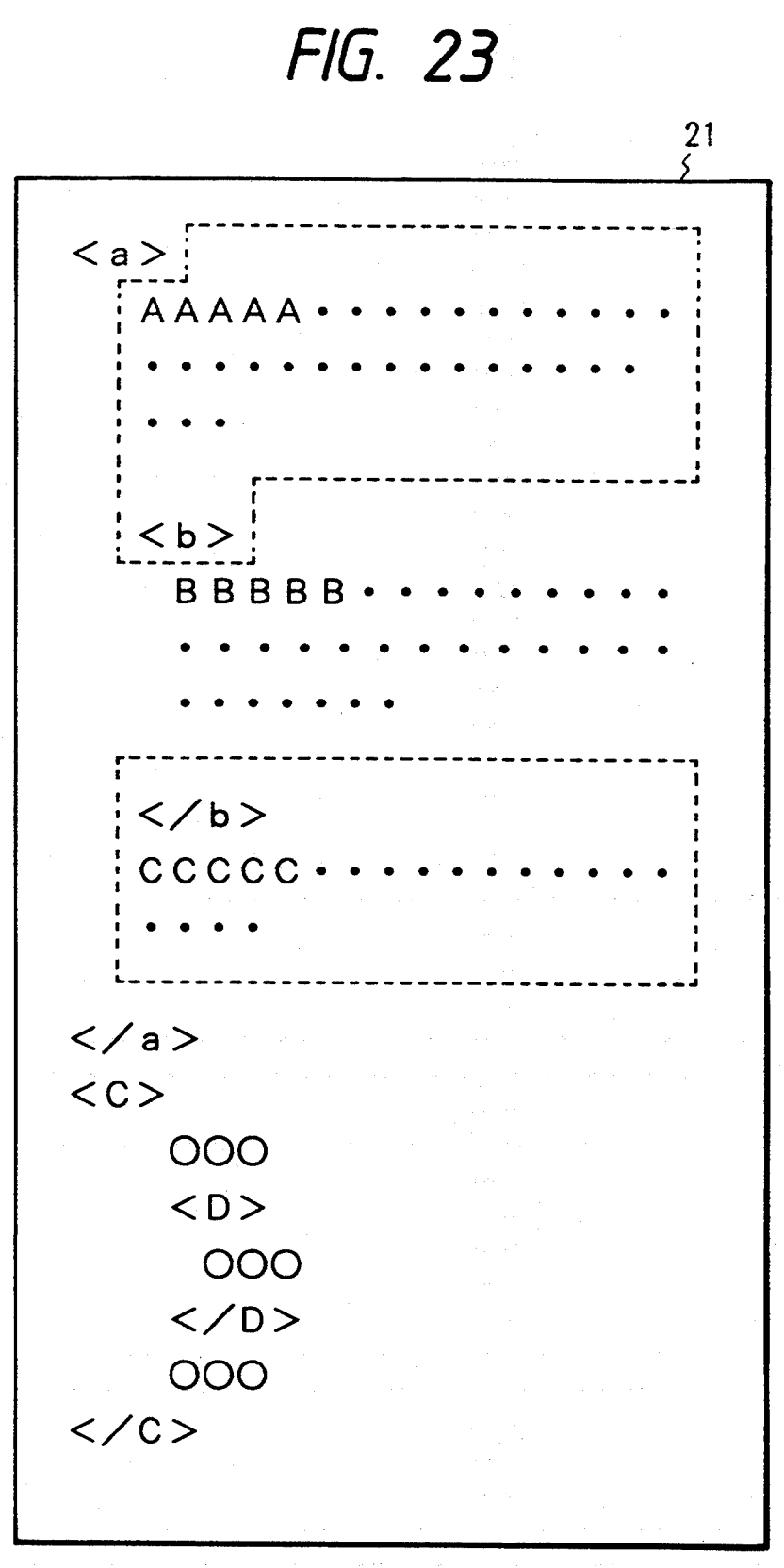

An example of the extracted character train is shown in FIG. 23, where a case in which text element name "a" is designated. The detailed description about the process is omitted here.

According to the aforesaid fifth and sixth embodiments, in a case where one text element includes another text element, the justification identification code is processed from the contents of the text element positioned outside while including only the punctuation marks of the included text element. Therefore, according to the fifth embodiment, the justification can be identified including the positional information regardless of the contents of the included text element. According to the sixth embodiment, the justification can be identified including the text element name and the attribute (if present) as well as the positional information of the included text element.

That is, according to the aforesaid methods, even if the content of the included text element is freely rewritten, a discrimination is made justifiable. Furthermore, if the inside text element is deleted, if its position is changed or if the text element name or the attribute is, if they are present, changed, a discrimination is made that the target text is not justifiable.

[Seventh Embodiment]

This embodiment is arranged in such a manner that the method of processing the included text element which is the target of the justification identification can be selected for each text element. Accordingly, a plurality of character train extraction forms for generating the code are provided so as to be selectively executed.

According to this embodiment, the text element is designated with the text element number similarly to the first, the third and the fifth embodiments. Furthermore, the character train extraction program can be selected from the character train extraction (a first extraction form) which includes only the punctuation marks of the second level text element according to the fifth embodiment and the character train extraction (a second extraction form) which includes all of the included text elements according to the first embodiment. Furthermore, the structure may be arranged in such a manner that the extraction form according to the third embodiment can be utilized.

The structure of the system according to this embodiment is substantially the same as that according to the first embodiment except for a difference that the first storage device has the aforesaid character train extraction program and the third storage device has a region for storing the selected extraction form (hereinafter called an "extraction form 37").

The flow of the process according to this embodiment is the same as the first embodiment except for the character train extraction process to be performed at the time of the text preparation and identification. Then, the process to be performed according to the character train extraction program 13 will now be described with reference to a text shown in FIG. 24.

Figure 24:
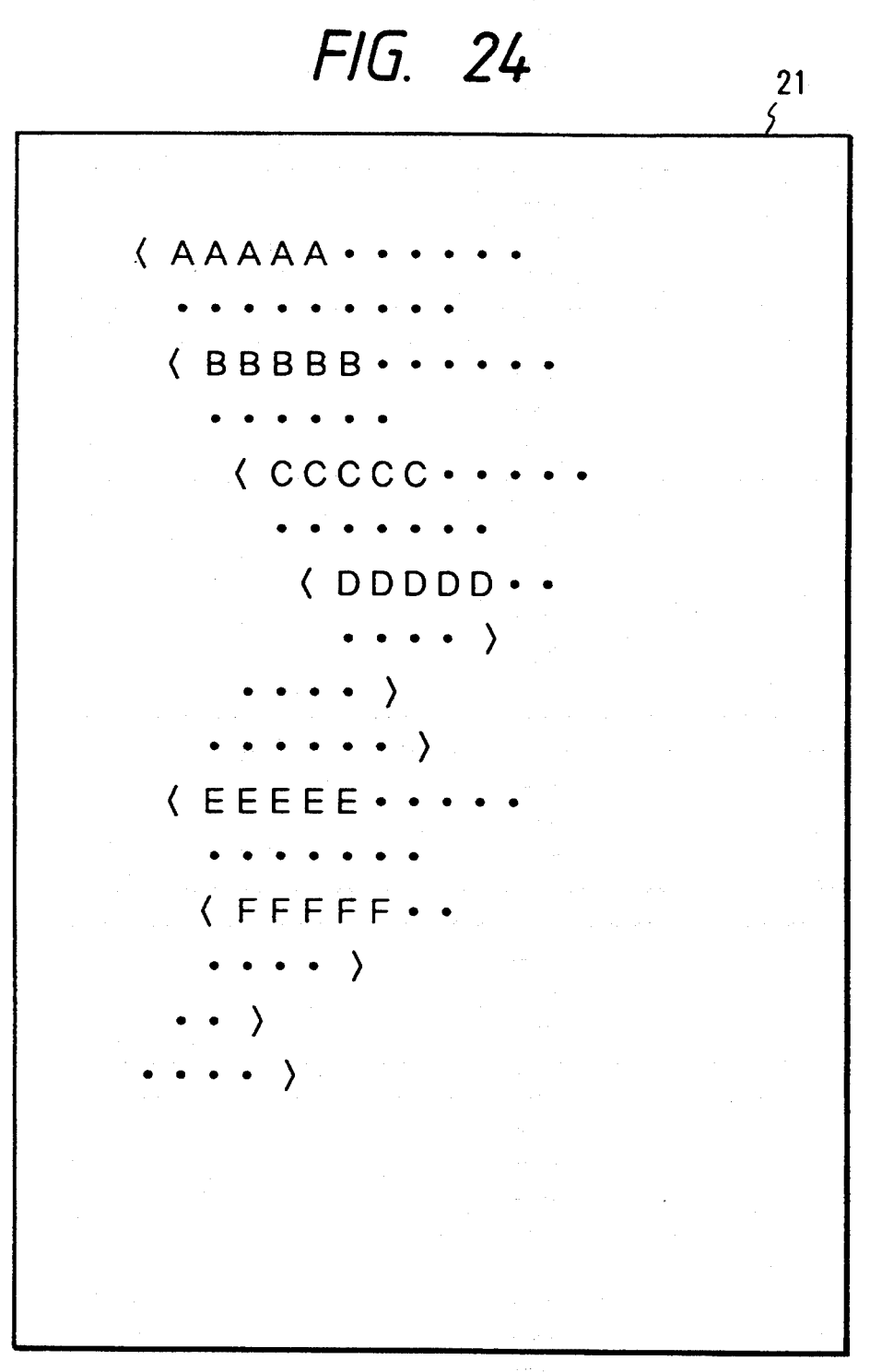

In the text shown in FIG. 24,
a text element starting with AAAAA ... includes
a text element starting with BBBBB ... and
a text element starting with EEEEE ...
Furthermore,
a text element starting with BBBBB ... includes
a text element starting with CCCCC ...

As described above, text element is able to include the sub text element and other text element in the form of a nest.

Referring to the drawing,
a text element starting with AAAAA ... has
a text element starting with BBBBB ... and
a text element starting with EEEEE ... as the sub text elements thereof.

The character train extraction program performs two types of operations depending upon the extraction form.

Figures 25A, 25B:
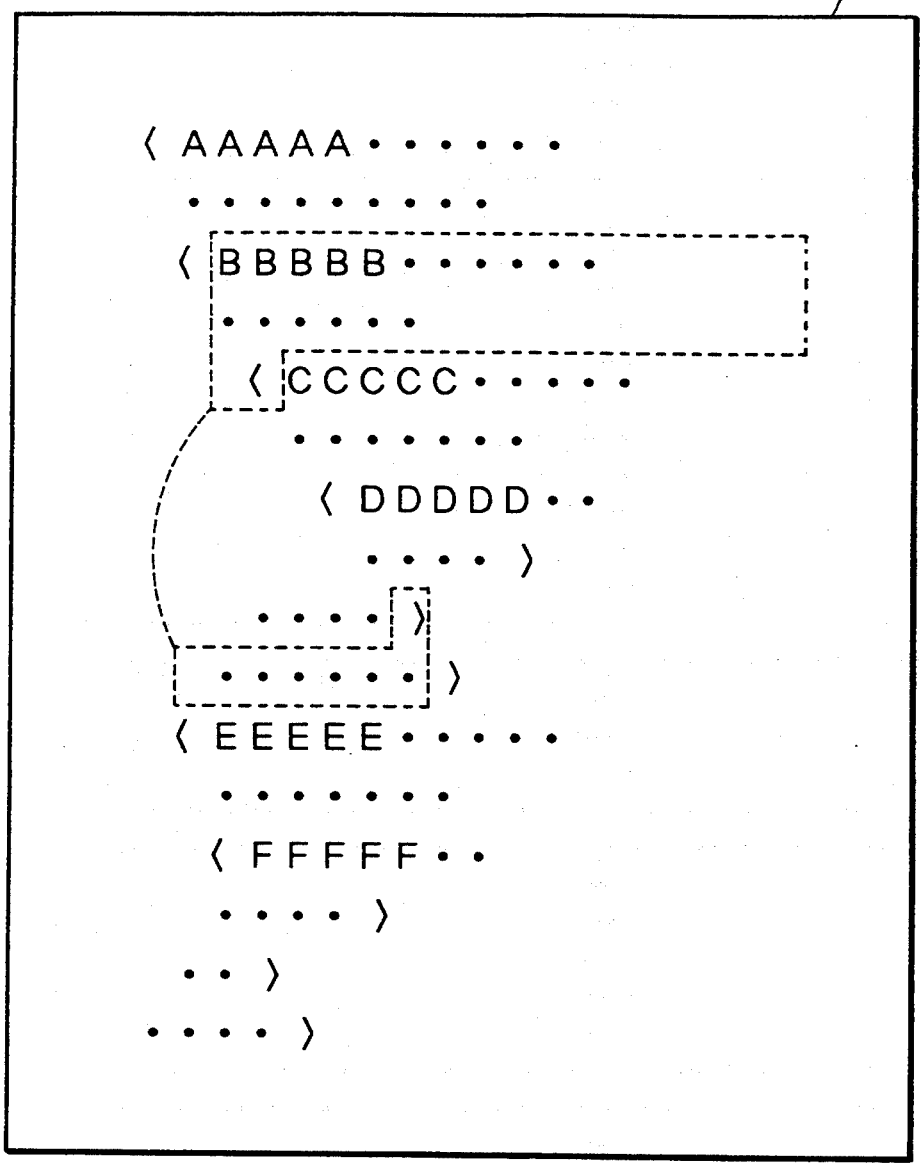
FIGS. 25A, 25B, 26A and 26B illustrate examples of extracted character trains according to the seventh embodiment of the present invention.

According to the first method, in a case where a second text element starting with <BBBBB as shown in FIG. 24 is encoded, only a range surrounded by a dashed line shown in FIG. 25A is made to be the target. That is, the punctuation marks of the sub text element is made to be the target and its content is not made to be the target. Therefore, the extracted character train is as shown in FIG. 25B. According to this embodiment, the punctuation mark for the third level text element <DDDDD ... are omitted from the content of the second level text element.

Figures 26A, 26B:
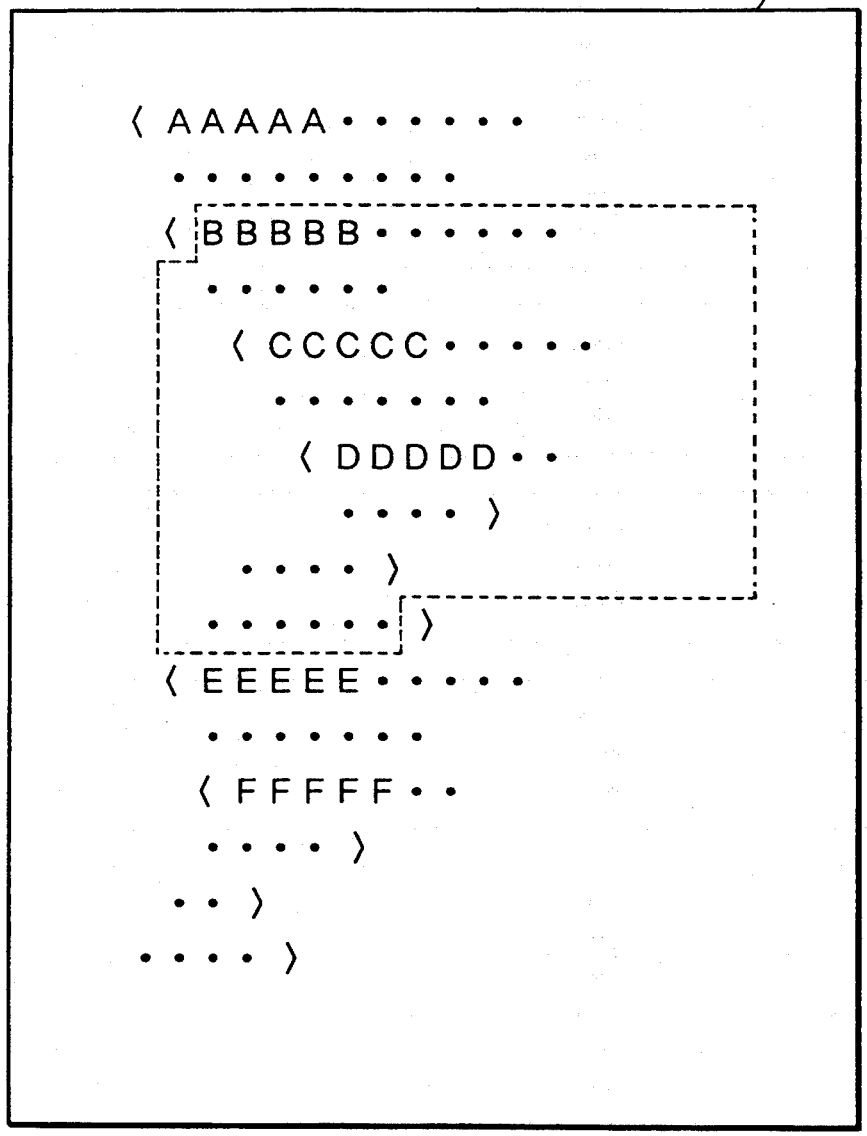

According to the second method, only the range surrounded by a line shown in FIG. 26A is made to be the target when the second text element shown in FIG. 24 is encoded. That is, the content of the sub text element including its punctuation marks are made to be the target. Therefore, the extracted character train is as shown in FIG. 26B.

Then, the flow of the process according to the present invention will now be described with reference with a flow chart shown in FIG. 28.

First, the start mark "<" of the text element to be processed is detected in step S2801. Then, a reference to the content of the extraction form 310 is made in step S2802 so as to determine the extraction form.

If the first method is determined, the character train just after the start mark of the designated text element to the character just before the corresponding end mark is stored in the target character train 34 while disregarding all of the contents of the sub text element, and the process is completed. At this time, although the content of the sub text element is disregarded, its start mark and the end mark is not disregarded. This allows the change of the content of the sub text element but a case is taken into consideration in which the position change takes place in the main text element.

If the second method is selected, all of the text trains from the portion just after the start mark of the designated text element to the portion just before the corresponding end mark are stored in the target character train 34, and the process is ended.

As described above, the character train extraction process in step S23 shown in FIG. 2 is completed. The ensuing processes are the same as those according to the first embodiment.

Figure 27:
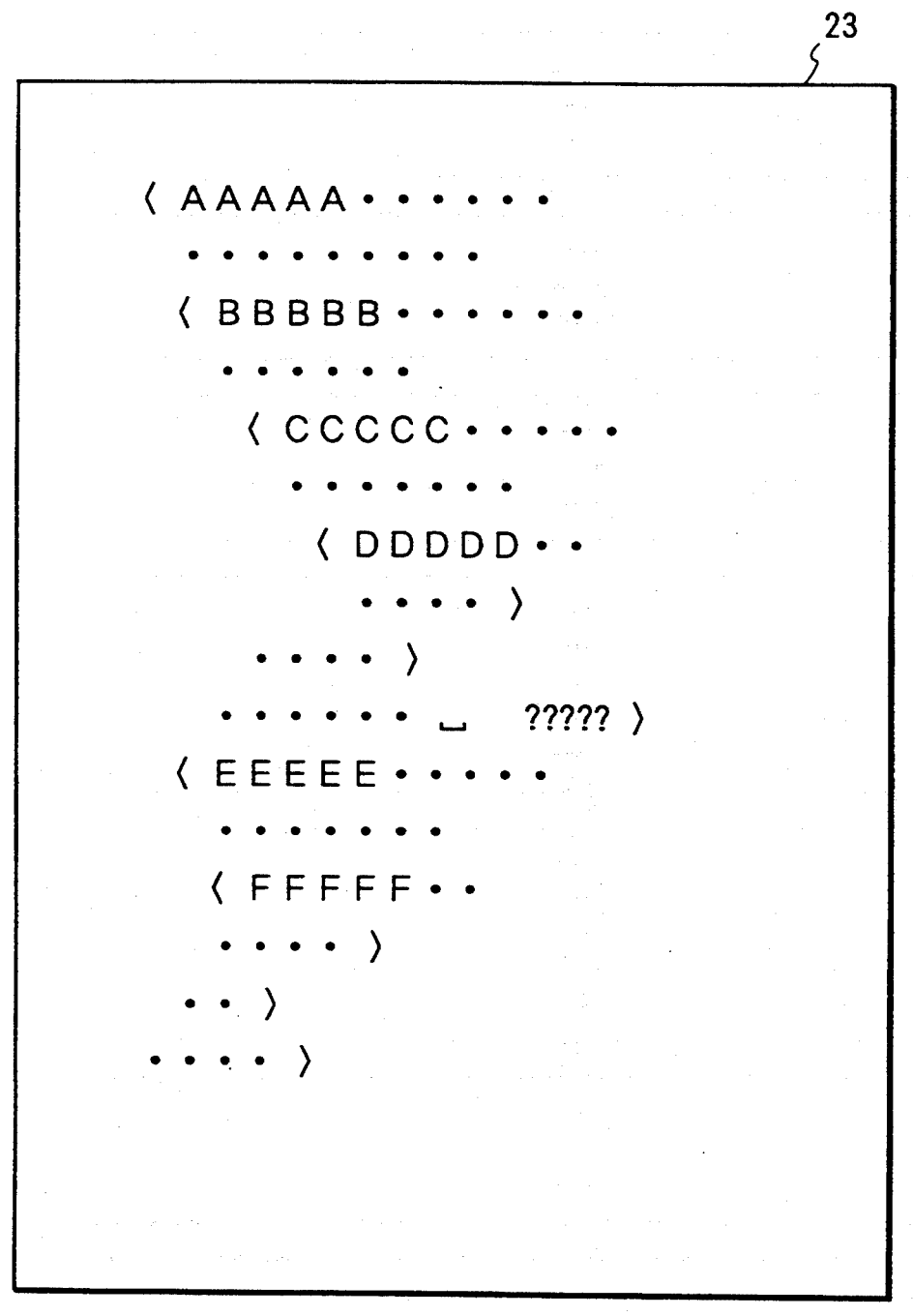

FIG. 27 illustrates an example of the text data 22 having the justification identification code. Referring to the drawing, the target text element is the second element (starting with <BBBBB ... ). The justification identification code is "?????" positioned just before the end mark of the second text element.

Referring to the example shown in FIG. 27, the justification identification code is inserted into the portion just before the end mark of the second text element to be separated from the content of the text element by one blank character.

Also the character train extraction process at the time of the identification is executed similarly to the character train extraction process at the time of the preparation described with reference to FIG. 28. At the time of the identification, the justification identification code and the blank character positioned just before it must be deleted from the extracted character train similarly to step S704 after the processes in step S2803 or 2804 have been executed.

[Eighth Embodiment]

Also in the eighth embodiment, the method of processing the second level text element included at the time of the justification confirmation is selected and the text element is designated by the text element name as is done according to the second embodiment in place of the text element number according to the seventh embodiment.

The structure of the system is made to be substantially the same as that according to the second embodiment except for an arrangement made in such a manner that the character train extraction program is able to select the extraction form in the first storage device and the third storage device has a region (hereinafter called the "extraction form 37") for storing the selected extraction form.

The flow of the process is the same as that according to the second embodiment except for the character train extraction process at the time of processing the text and identifying the justification. The character train extraction process can be performed in this way that the text element number for use in the structure according to the seventh embodiment is replaced by the text element name by reading and the punctuation of the text element is discriminated according to the element name. Then, the character train extraction process according to this embodiment will now be described with reference to FIG. 29.

Figure 28:
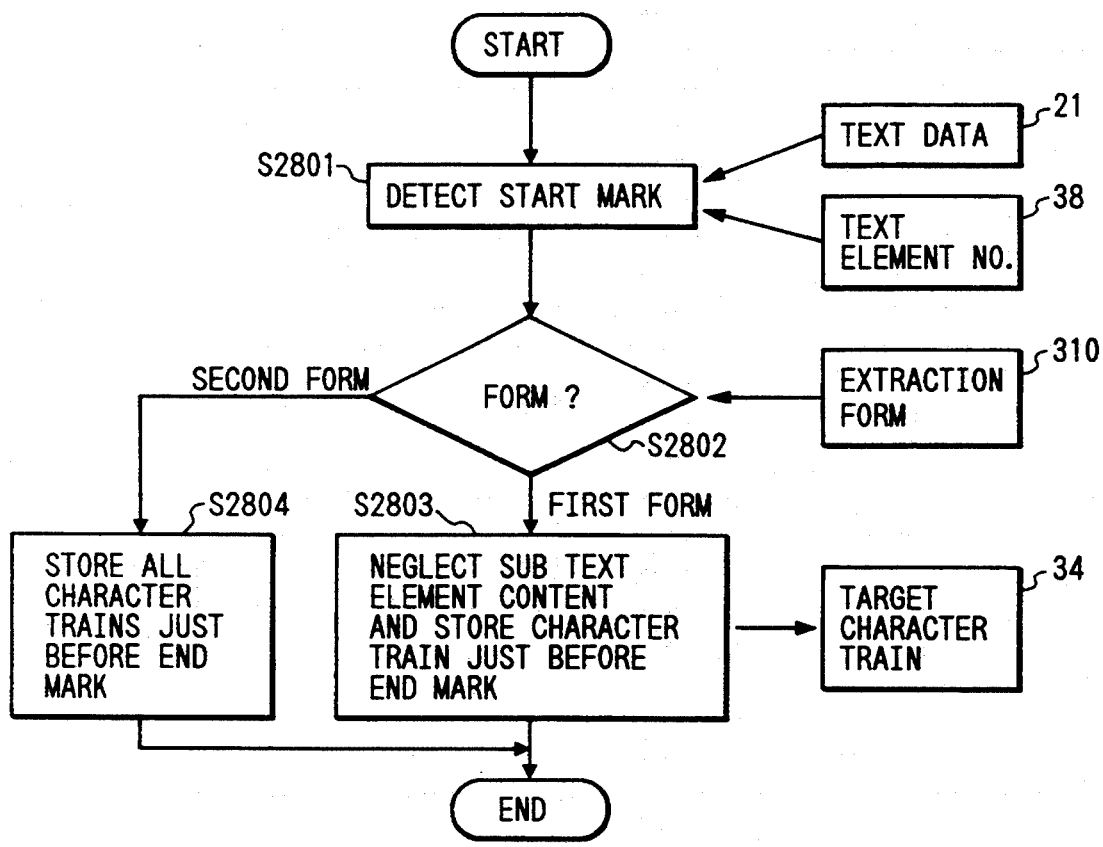
FIG. 28 is a flow chart which illustrates a character train extraction process to be performed at the time of the text preparation according to the seventh embodiment of the present invention.

Similarly to the embodiment shown in FIG. 28, the two types of operations are performed depending upon the method of the extraction.

With the first method, only a range surrounded by a dashed line shown in FIG. 30A is made to be the target when text element "b" shown in FIG. 29 is encoded. That is, the punctuation marks (the start mark and the end mark) for the sub text element is the target of the code generating process but the content of the sub text element is not the target. Therefore, the extracted character train is as shown in FIG. 30B.

With the second method, the a range surrounded by a dashed line shown in FIG. 31A is made to be the target when the text element "b" shown in FIG. 29. That is, the content of the chile text element including the punctuation marks are the target. Therefore, the extracted character train becomes as shown in FIG. 31B.

In the first method, it might be feasible to neglect the character train except for the text element name placed in the punctuation marks (the start mark and the end mark) for the sub text element.

FIG. 32 illustrates an example of the text data 22 having the justification identification code.

Referring to FIG. 32, the justification identification code is "?????" included in the end mark for the text element b.

As described above, the text is processed according to this embodiment. The description of the identification process is omitted here. As described above, the text element the justification of which is desired to be identified can be designated with the name of the text element.

Since the punctuation marks for the sub text element is also made to be the target of the encoding process, the justification of the text element can be identified including the name and the position of a text element in the target text element.

As described above, according to the seventh and the eighth embodiments, in a case where text data is sectioned into one or more text elements by the text punctuation marks and a plurality of text elements can be, in the form of the nest, present in the aforesaid text element, the first character train extraction form is arranged to take a character train included in a certain text element while omitting the contents of the sub text element (the start mark and the end mark for the sub text element are not omitted) and the justification identification code for the target text element is processed from the aforesaid character train. Therefore, the justification is identified while including the position of the sub text element and the text element name and the attribution information, if the text element name and the attribution are described in the punctuation mark. That is, the justification identification code is processed while including no contents of the sub text element. Therefore, even if the content of the sub text element is freely reloaded, the outside (main) text element is discriminated to be justifiable. If the sub text element is deleted, if its position is changed or if the text element name or the attribute, if they are present, is changed, the target text is discriminated to be unjustifiable.

The second character train extraction form is arranged to take the character train included in a certain text element while taking out all of the contents of the sub text element (including the start mark, the contents and the end mark of the sub text element included) and the justification identification code for identifying the target element is processed from the aforesaid character train. Therefore, the justification can be identified while including the position, the content, the name and the attribute, if described, of the sub text element. Furthermore, labor required to complete the justification identification operation can be decreased. That is, in the aforesaid method, the justification identification code is processed from all of the contents of the text element. Therefore, the target text is discriminated to be unjustifiable if the content of the sub text element is reloaded, if it is deleted, if the position is changed or if the text element name or the attribute, if present, is changed.

[Ninth Embodiment]

Although the seventh and the eighth embodiments are each arranged in such a manner that the included second text element can be processed by a selected method at the time of the identification of the justification of the first level text element, this embodiment is arranged to previously describe whether or not each second level text element is controlled by the main text element and to identify the text element controlled by the main text element and to identify only the punctuation marks if it is not controlled by the same.

The structure of the system according to this embodiment is arranged substantially similarly to that according to the second embodiment except for a specific character train extraction program 13 in the first storage device and a fact that the second storage device has control data 24 for controlling each text element and formed into a table.

The flow of processing the text is basically the same as that shown in FIG. 11 and then the different arrangement will now be described.

Referring to a text shown in FIG. 29, the operations for processing and registering the control data 24 at the time of processing a text according to this embodiment will now be described.

According to this embodiment, the text element in the text data 21 is given a code for controlling the text element by the author of the text. As the control code, the name of the author of the text element is used here.

It is not necessary for all of the text elements to be given the control code, that is the name of the author. Text elements having no author' name are controlled similarly to their text element (that is, they are processed by the same author). The code is given in such a manner that the correspondence between the text elements and the authors are written in a file formed into a table, the table form file being the control data 24.

Referring to FIG. 33, the author of text element "a" is "Suzuki" and that of the text element "b" is "Sato". Furthermore, no information is possessed about text elements "c" and "f" which are not described here.

The name of the aforesaid file (the control data 24) is formed by adding a specific expander to the name of the text data 21 in order to correspond to the text data 21 (since a plurality of text data can be present as well as the text data 21). For example, the name of a file (the control data 24) in which the correspondence between the text element and the code (the author' name) of a text data named "file" is described may be "file. dat". However, the name is not limited if the relationship between the text element and its control code (the author's name according to this embodiment) can be understood. Thus, the preparation can be established. Then, in step S1101 shown in FIG. 11, the text data 21, the text data 23 having the justification identification code and the position at which the control data 24 is stored (for example, the file name) are input to determine the target of the text processing operation. In next step S1102, the text element to be registered is designated by using the console 1 so as to store it in the text element name 39. The text element to be designated must have a control code.

In next step S1103, the character train extraction program 13 is started to read the character train from the target text element, the character train thus read being then stored in the target character train 34. Since the ensuing processes are the same as those according to the second embodiment, their descriptions are omitted here.

Then, the process to be performed in step S1103 according to this embodiment, that is the operation to be performed according to the character train extraction program 13 will now be described.

According to this program, the content (no start and end marks of the designated text element included) of the text element designated with the text element name 39 is taken. In this case, if another text element is included, the following process is performed.

In a case where the included text element is given the control code (it can be discriminated by making a reference to the control data 24), the extraction of the content of the text element (the included text element=sub text element) is not performed but the start and the end marks of the text element are taken. In a case where the included text element is not given the control code, the content of the text element is extracted as well as the start and the end marks.

In a case where the text data shown in FIG. 29 is the target of the process and control data shown in FIG. 33 is processed, a character train as shown in FIG. 34A is extracted by subjecting the text element "a" to the character train extraction process.

By similarly processing the text element "b", a character train shown in FIG. 34B is extracted.

Then, the flow of the character train extraction process will now be described with reference to a flow chart shown in FIG. 35.

First, in step S3501, the pointer is jumped to a position just after the start mark of the text element designated with the text element name 39. In next step S3502, the point is sequentially moved forward to extract the character trains until the next text punctuation mark is detected. In next step S3503, a discrimination is made whether or not the detected text punctuation mark is the end mark for the target text element (the main text element). The discrimination is made depending upon whether or not the target text element name is present in its punctuation mark and depending upon whether or not the same is the end mark. If a discrimination "YES" is made, all of the character trains which must be extracted have been extracted and therefore the process according to this embodiment is completed. If a discrimination "NO" is made (that is, the detected text punctuation mark is the punctuation mark for the "sub text element"), the flow proceeds to step S3504.

In step S3504, a discrimination is made whether or not the text element corresponding to the detected text punctuation mark is given the control code. In this case, if the text element name of the text element is registered in the control data 24, a discrimination is made that the control code is given. In the case of the end mark, a discrimination is made that no control code is given. If the same is not given, the ensuing character trains including its punctuation mark are the character trains which are the target of the extraction and therefore the flow returns to step S3502 (then, the process proceeds to the lower hierarchies of the nest until the start mark for the text element registered in the control data or the end mark of the designated text element is detected).

If a discrimination is made that the control code is given, it can be considered that the detected punctuation mark is not the end mark but is the start mark for the sub text element if the target text element is written correctly in terms of the structure.

Since the aforesaid "sub text element" is given the control code, the character train placed just before the corresponding end mark is the character train which is not the target of the process. Therefore, the point is moved forwards to the aforesaid end mark to continue the process of extracting the character trains.

If an element except for the text element name is included in the start mark or the end mark (for example, the justification identification code is inserted into the end mark at the time of a justification identification process to be described later), it is disregarded (is not extracted).

Thus, the character train is extracted and stored in the target character train 34.

Figure 35:
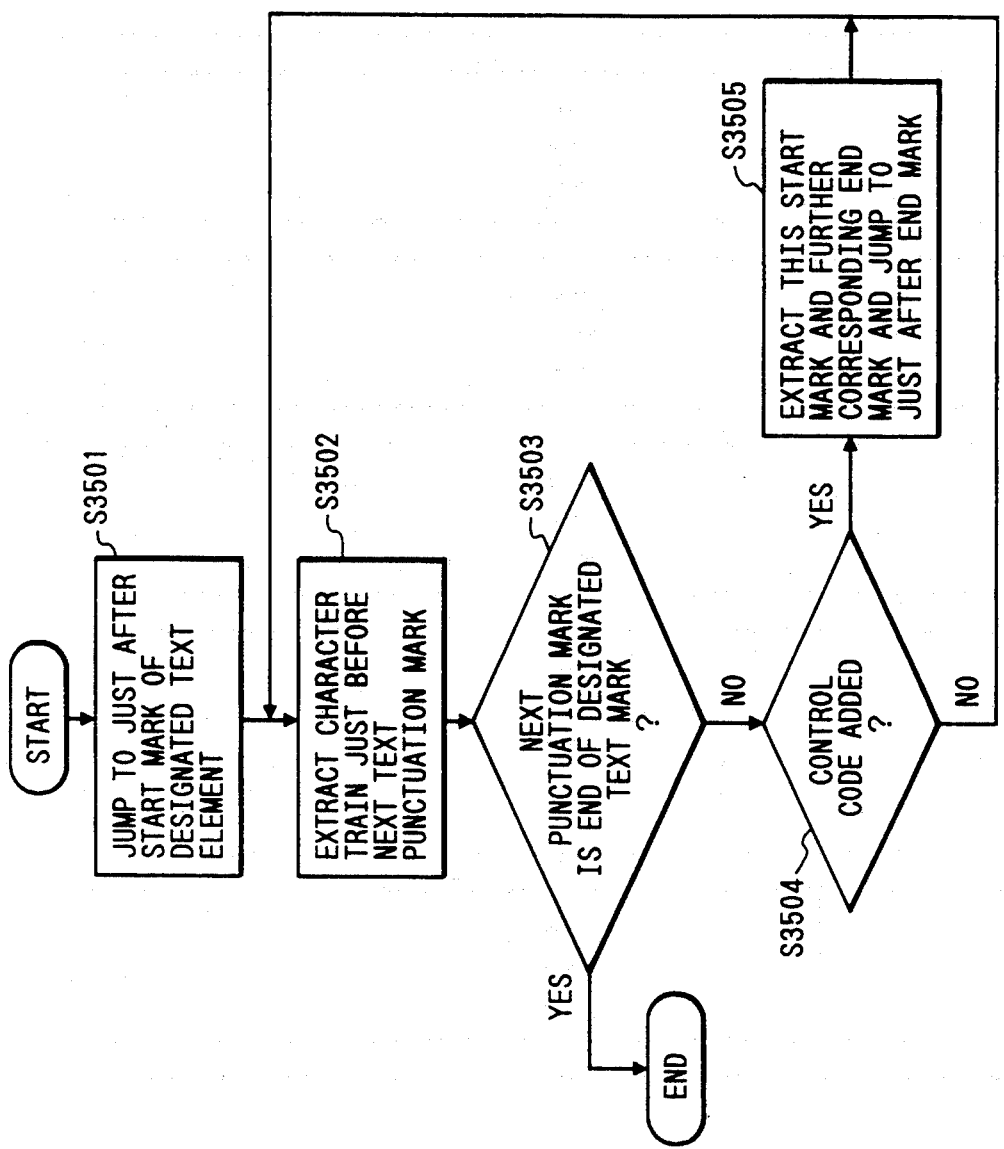
FIG. 35 is a flow chart which illustrates a character train extraction process to be performed at the time of the text preparation according to the ninth embodiment of the present invention.
Figure 37:
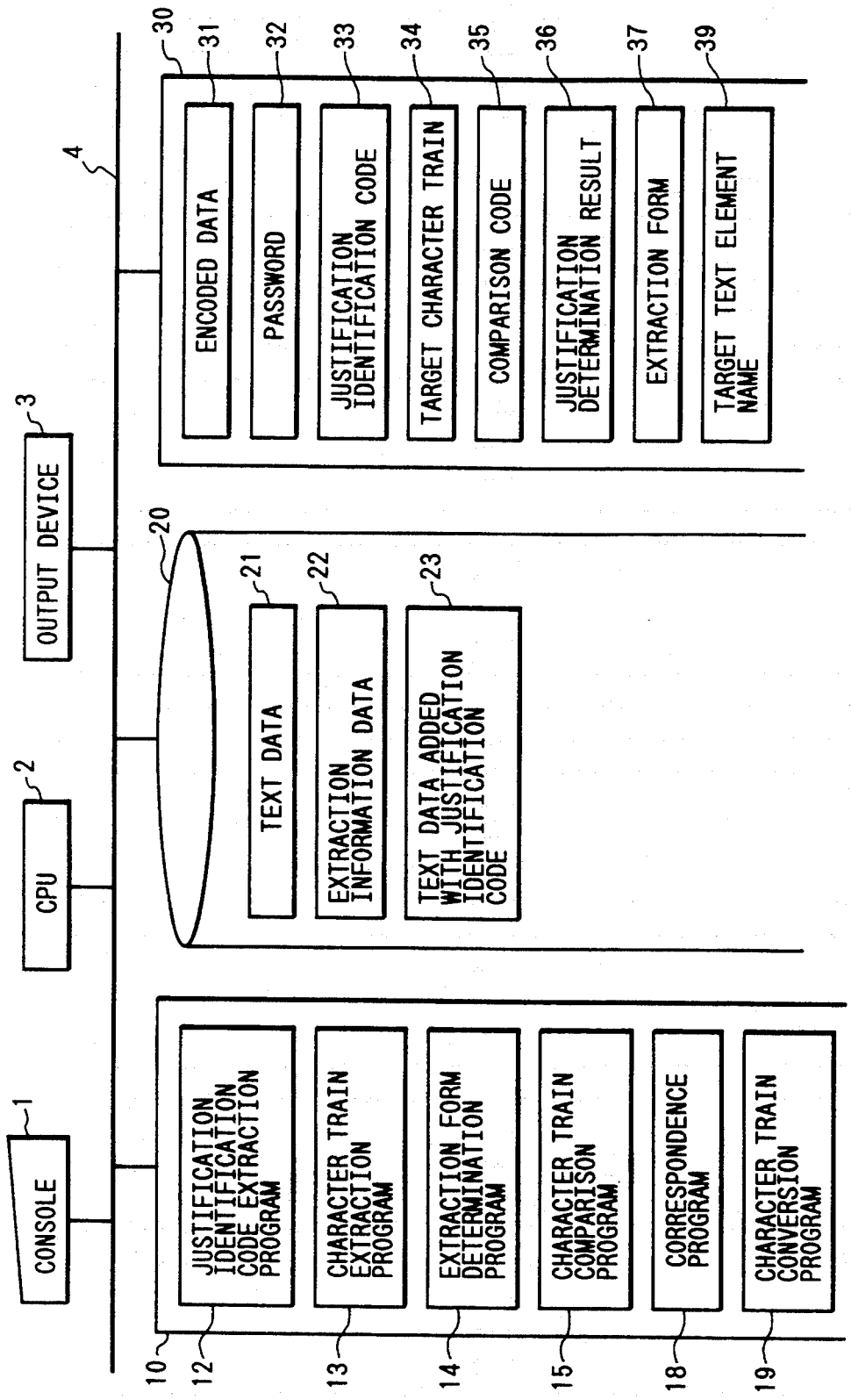
FIG. 37 is a structural view which illustrates a system according to an eleventh embodiment of the present invention.

The operations to be performed at the time of the identification are performed according to the flow chart shown in FIG. 14 but the character train extraction process is executed substantially similarly to the character extraction process at the time of processing a text shown in FIG. 35. Therefore, their descriptions are omitted here.

[Tenth Embodiment]

Also this embodiment is, similarly to the ninth embodiment, arranged in such a manner that whether or not each second level text element is controlled by the main text element and information about this is used to make the text element under the control of the main text element to be the target of the identification. If it is not controlled by the main text element, only its punctuation mark is subjected to the identification process. Although the ninth embodiment is arranged to have the table type file as the control data 24, this embodiment is arranged in such a manner that the punctuation mark for each text element has the control code for the text element described therein.

Also according to this embodiment, the author's name is utilized as the control code similarly to the ninth embodiment. Referring to the text shown in FIG. 29, the relationship shown in FIG. 33 is expressed as shown in FIG. 36 according to this embodiment.

In a case where the control code is described in the punctuation mark, a character train, for example, "author= suzuki" is inserted into the start mark to a position after the text element name while interposing a blank character.

Similarly to the ninth embodiment, the name of the author of the text element is used as the control code. As a result, a fact that the target text element is suzuki. Furthermore, the necessity of describing the control code to all of the text element can be eliminated similarly to the first embodiment. That is, the text element having no description is controlled similarly to the main text element (is assumed to be processed by the same author).

However, although the ninth embodiment is arranged in such a manner that the correspondence between the text elements and the control codes is described in the individual file, this embodiment is arranged in this way that the it is described in the punctuation mark in the text data. Therefore, whether or not the control code is given is discriminated depending upon whether or not character train "author" is present in the start mark.

If a character train except for the text element name is present in the punctuation mark (the start mark and the end mark) for the sub text element, it is disregarded. That is, the character train such as "author=suzuki" included in each start mark is not extracted at the time of extracting the character train (also the blank character for separating the text element name from the control information is not extracted).

Since the operation according to this embodiment is the same as that according to the ninth embodiment except for the arrangements in which the control code is inserted into the punctuation mark as described above and a reference is made to the control code in the punctuation mark at the time of extracting the character train, its detailed description is omitted here.

As described above, according to the ninth and the tenth embodiments, the following effects can be obtained in a case where one text data is divided into one or more text elements by the text punctuation marks and other character elements can be present in the text element while forming a nest:

i. The justification of the text element can be controlled for each collective text element regardless of the hierarchy in the nest.

ii. Since the necessity of giving the control code to all of the text elements can be eliminated, the operation required to complete the operation i can be simplified.

iii. The text element which is not designated to be controlled can be controlled by the same manner as that for the main text element.

Even if a discrimination is made that the sub text element is not controlled by the main text element, the punctuation marks in the main text element are encoded. Therefore, the justification of the text element can be identified while including the position and the name of the text element positioned in the target text element. In other words, even if the content of the sub text element is freely reloaded, the outside (main) text element is identified to be "justifiable". If the sub text element is deleted, if the position of it is changed, or if the text element name or the attribute, if possessed, is changed, the target text element is identified to be "unjustifiable".

[Eleventh Embodiment]

The seventh and the eighth embodiments are each arranged in such a manner that the method of processing the included text element is selected for each text element at the time of the justification identification process. According to this embodiment, the extraction form for each text element is determined according to information previously registered.

First, the flow of the text processing and registration operations will now be described with reference to a flow chart shown in FIG. 38.

In step S3801, the author of the text process the text data 21 similarly to the aforesaid embodiments. According to this embodiment, the text data shown in FIG. 29 is used as an example.

Figure 39A:
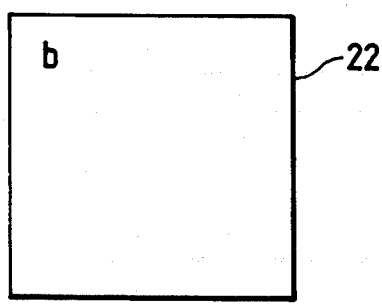
FIGS. 39A and 39B illustrate examples of extracted information data.

In next step S3802, the author of the text processes the extraction information data 22 by using an editor or the like. The extraction information data 22 is a file of the text element names, which must use the second extraction form, that is all of their contents must be the target of the extraction. An example of this is shown in FIGS. 39A and 39B.

Figure 39B:
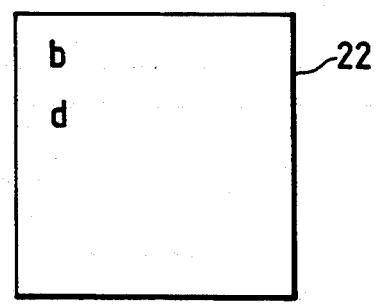

For example, FIG. 39B illustrates a fact that text elements "b" and "a" have, as the target of the extraction, all of character trains just after the start mark to the position just before the end mark. The text data 21 processed in step S3801 and the extraction information data 22 processed in step S3802 are recognized as relative data at this time. Assuming that the file name of the text data 21 is "report", the file name of the extraction information data 22 is "report.info" to be related to each other by the convention of the file name.

In next step S3803, the text 23 having the justification identification code is processed by the operation of processing the text data having the justification identification code according to the text data 21 and the extraction information data 22. Thus, the text data is processed (registered).

Then, the operation of processing text data having the justification identification code will now be described with reference to a flow chart shown in FIG. 40.

First, in step S4001, the positions (the file name and the like) in which the text data 21, the extraction information data 22 and the text dat 23 having the justification identification code are input. In next step S4002, the text element name which is the target of the justification identification is input by a user to store it as the target text element name 39. Then, in step S4003, the text element name which is the same as the target text element name 39 is sequentially scanned from the front portion of the text data 21.

In step S4004, whether or not the text data 21 has been ended is examined. If the same has not been ended, an operation in step S4005 is executed. If the same has been ended, the text data 21 is, as the text data 23 having the justification identification code, stored in the storage device 20. Thus, the operation of processing the text data having the justification identification code is completed.

In step S4005, the extraction form discrimination program 14 is used to discriminate whether or not the target text element name 39 is included in the extraction information data 22 is discriminated. If the same is not included, "1" is stored in the extraction form 37, while "2" is stored if the same is included.

In next step S4006, the text train extraction program 13 is used to extract the content of the target text element from the text data 21 according to the content of the extraction form 37 and the result of this is made to be the encoding data 31. The character train extraction program 13 allows the following first and second operations to be performed depending upon the method of extracting the character train.

The first method is used when the extraction form 37 is "1".

In a case where the text data as shown in FIG. 29 is present and only "d" as shown in FIG. 39A is present as the extraction information data 22, the text element "b" is extracted by the first method and a portion surrounded by a dashed line shown in FIG. 30A is made to be the target of the extraction.

That is, the punctuation marks for the sub text element are the target of the code generating process but the contents of the same are not the target. Therefore, the extracted character train becomes as shown in FIG. 30B.

The second method is used when the extraction form is "2".

In a case where the text data is as shown in FIG. 29 and "b" and "d" are present as its extraction information data 22, the text element "b" is extracted by the second method and the portion surrounded by a dashed line shown in FIG. 31A is the target of the extraction.

That is, the sub text element is target of the extraction including its punctuation marks. In this case, the extracted character train becomes as shown in FIG. 31B.

Referring back to FIG. 40, the justification identification code is processed and stored in step S4007. The justification identification code is processed according to the character train in the encoded data 31 (the character train extracted in the aforesaid step S4006 is stored) to be added to the text data 21 so as to be stored as the text data 23 having the justification identification code. Thus, the operation of processing the text data having the justification identification code is completed (see FIG. 32).

Figure 38:
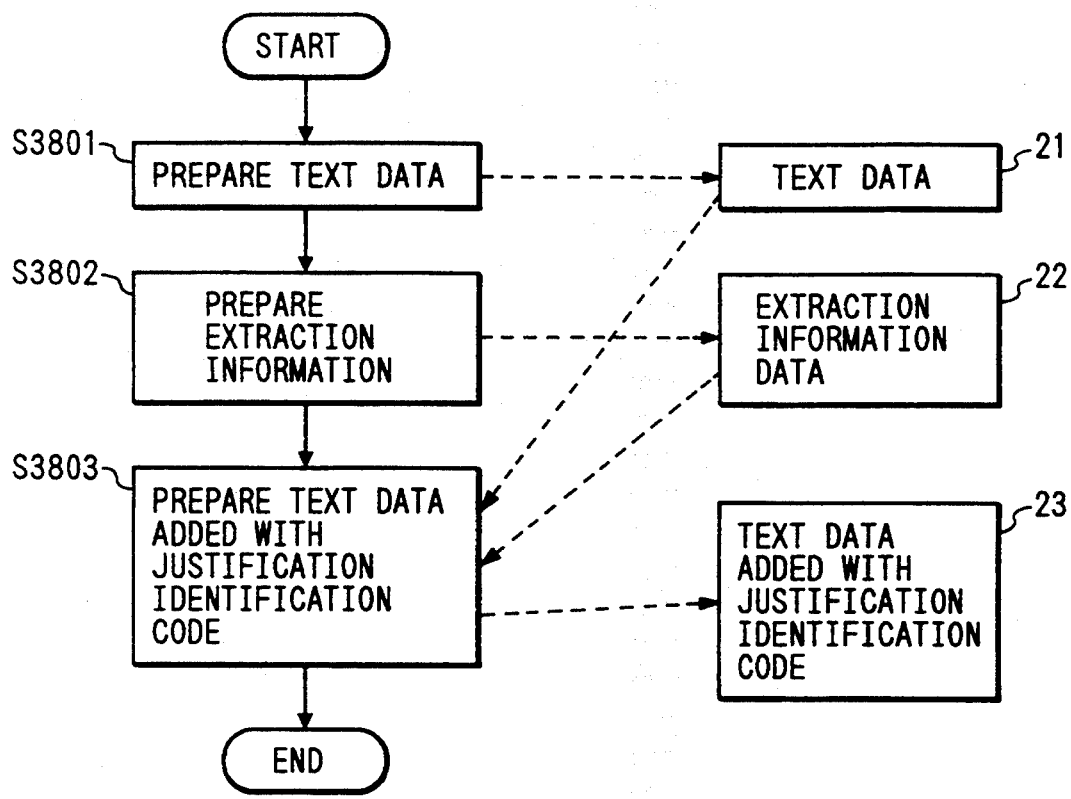
FIG. 38 is a flow chart which illustrates a text preparation and registration process according to the eleventh embodiment of the present invention.
Figure 40:
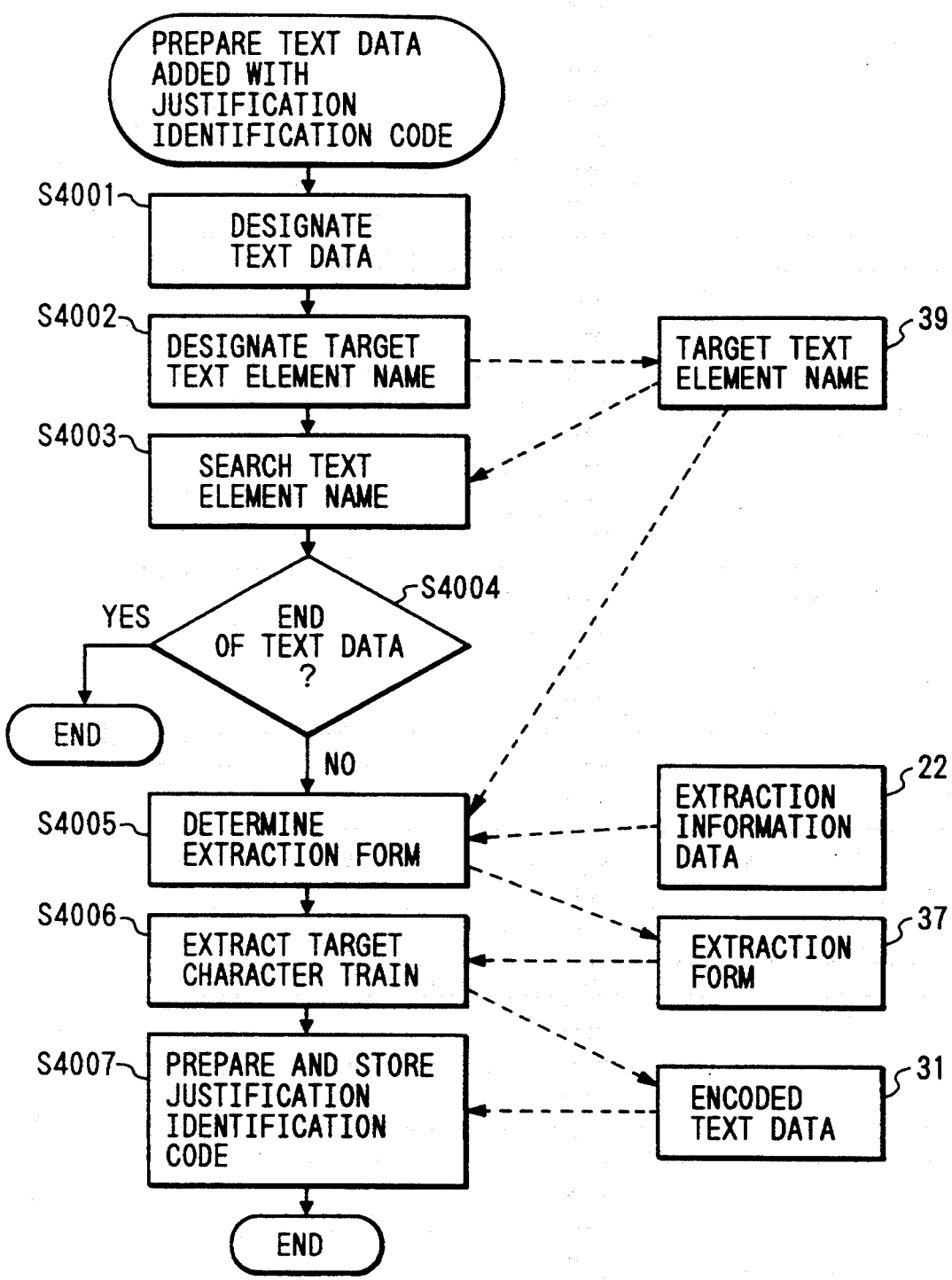
FIG. 40 is a flow chart which illustrates the text preparation and registration process according to a twelfth embodiment of the present invention.

At the moment at which the operation of processing the text data having the justification identification code shown in FIG. 40 is completed, processing and registering the text shown in FIG. 38 are completed. By repeating the operation in this process, each of a plurality of text elements can be given the justification identification code. Also the character train extraction for the justification identification process is executed similarly to the processing operation. The other operations for performing the identification are performed similarly to the aforesaid embodiments and therefore their descriptions are omitted here.

[Twelfth Embodiment]

Although the eleventh embodiment is arranged in this way that the name of the text element which must use either of the two extraction forms is registered and the extraction form is determined according to the registered information, this embodiment is arranged in such a manner that the extraction form for each text element is registered. As a result, three or more extraction forms can be employed.

The flow of the operations according to this embodiment is substantially the same as that according to the eleventh embodiment except for the portion relating to the extraction information data 23. The extraction information to be processed according to this embodiment includes the structure of the text element in the text data and information about the extraction form for each text element.

An example of the extraction information data 22 to be processed by the extraction information processing program (16) in a case where the text data 21 is as shown in FIG. 29 is shown in FIG. 41.

Referring to FIG. 41, all of the start mark and the end mark for the text data are used to express the structure of the text element. By placing "1" or "2" to the position after the start mark, the content of the text element is extracted by the first method in a case of "1", while the same is extracted by the second method in a case of "2".

Then, the operation of processing text data having the justification identification code according to this embodiment will now be described with reference to a flow chart shown in FIG. 40.

Since steps S4001 to 4004 are the same as those according to the eleventh embodiment, their descriptions are omitted here. In step S4005, an extraction information retrieving taking program 17 is used to retrieve the start mark for the same text element name as the target text element name 39 from the extraction information data 22 to take information about the method of extracting the text element described just after the start mark, the information being then stored in the extraction form 37.

Steps S4006 and 4007 are the same as those according to the eleventh embodiment. When the operation in step S4007 is completed, the operation of processing the text data having the justification confirmation code is completed.

Also the justification identification process according to this embodiment is performed similarly to the eleventh embodiment.

[Thirteenth Embodiment]

Although the eleventh and the twelfth embodiments are arranged in this way that information about the extraction form is stored as a file individual from the text, this embodiment is arranged in such a manner that it is inserted into the punctuation mark.

The text data 24 having extraction information becomes as shown in FIG. 42 in a case where the target text data is as shown in FIG. 29.

Referring to FIG. 42, character train "group" which shows the attribute, "=" and attribute values "1" and "2" are placed after the text element name in the start mark of the text data. In a case of "1", the content of the text element is extracted by the first method, while the same is extracted by the second method in a case of "2".

Specifically, the start mark for the text data is retrieved and information about the selection of the extraction form for each text element is, together with attribute "group" and "=", stored in the start mark. An editor is used to directly write them on the text data shown in FIG. 29 to process text data having extraction information as shown in FIG. 42.

Then, text data 23 having the justification identification code can be processed from text data 24 having extraction information by retrieving the start mark having the same text element name as that of the target text element 39 from the front portion of the text data 24 having the extraction information, by taking information about the extraction form for extracting the text element described in the mark, if it is detected, and by storing it in the extraction form 37. The ensuing processes are the same as those according to the eleventh embodiment.

According to this embodiment, an effect can be obtained in that the extraction form can be freely employed for each text element to perform the justification identification. Furthermore, another effect can be obtained in that the extraction information data is stored in the same file for the text data.

As described above, according to the eleventh to the thirteenth embodiments, the following effects can be obtained:

(1) Since extraction information about the text element in a text can be prepared previously and used, the necessity of designating the extraction at the time of registering and identifying the justification can be eliminated.

(2) Whether or not the designated text element has been updated (whether or not the target text element is a justifiable text) can be confirmed depending upon the extraction information.

Although the data which is the target of the discrimination whether or not the contents of data has been changed is the text data according to the first to the thirteenth embodiments, it may be a program data. That is, the present invention can be applied to identify the justification of a program source.

Furthermore, the result of the identification of the justification may be made an input for a certain process in each of the embodiments.

The present invention may be adapted to a system composed of a plurality of apparatuses or an apparatus composed of one unit. Furthermore, the present invention may, of course, be applied to a structure which is realized by supplying a program to a system or an apparatus.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of discriminating, for each first level partial data, whether or not saved data, one file of which is composed of a plurality of the first level partial data and each of the first level partial data is able to include a second level partial data, has been unjustifiably rewritten, said method comprising steps of:
   (a) at a time of saving a file,
      designating a first level partial data on the basis of a user instruction;
      receiving a password from a user;
      converting the received password and the designated first level partial data, which includes a second level partial data, according to a predetermined procedure to generate a first code; and
      saving the file with storing of the first code to correspond to the designated first level partial data;
   (B) at a time of reading the saved file,
      reading the saved file;
      designating the first level partial data on the basis of a user instruction;
      receiving the password from the user;
      converting the received password and the designated first level partial data, which includes the second level partial data if the designated first level partial data includes the second level partial data, according to said predetermined procedure to generate a second code;
      comparing the generated second code with the first code stored to correspond to the designated first level partial data; and
      discriminating that the designated first level partial data has been unjustifiably rewritten if comparison results in a fact that the first code is not equal to the second code.

2. The method according to claim 1, wherein the data is a text.

3. The method according to claim 1, wherein the data is a program.

4. The method according to claim 1, wherein partial data is distinguished from each other by punctuation information.

5. The method according to claim 4, wherein the punctuation information belongs to each partial data and the first code is stored while being included in the punctuation information belonging to the partial data to which the code corresponds.

6. The method according to claim 1, wherein the partial data is designated depending upon the sequential order of the partial data in all of data items.

7. The method according to claim 1, wherein each of the partial data is given a name and designation of the partial data is performed with the name of the partial data.

8. The method according to claim 7, wherein the partial data is designated from each other by punctuation information and the name of the partial data is included in the punctuation information.

9. A method of discriminating, for each first level partial data, whether or not saved data, one file of which is composed of a plurality of first level partial data and each of the first level partial data is able to include a second level partial data, has been unjustifiably rewritten, said method comprising steps of:
   (A) at a time of saving a file,
      designating a first level partial data on the basis of a user instruction;
      receiving a password from a user;
      converting the received password and the designated first level partial data, from which a second level partial data is omitted, according to a predetermined procedure to generate a first code; and
      saving the file with storing of the first code to correspond to the designated first level partial data;
   (B) at a time of reading the saved file,
      reading the saved file;
      designating the first level partial data on the basis of a user instruction;
      receiving the password from the user;
      converting the received password and the designated first level partial data, from which the second level partial data is omitted, according to said predetermined procedure to generate a second code;
      comparing the generated second code with the first code stored to correspond to the designated first level partial data; and
      discriminating that the designated first level partial data has been unjustifiably rewritten if comparison results in a fact that the first code is not equal to the second code.

10. The method according to claim 9, wherein the data is a text.

11. The method according to claim 9, wherein the data is a program.

12. The method according to claim 9, wherein the partial data is distinguished form each other by punctuation information.

13. The method according to claim 12, wherein the punctuation information belongs to each partial data and the first code is stored while being included in the punctuation information belonging to the partial data to which the code corresponds.

14. The method according to claim 9, wherein the partial data is designated depending upon the sequential order of the partial data in all of data items.

15. The method according to claim 9, wherein each of the partial data is given a name and designation of the partial data is performed with the name of the partial data.

16. The method according to claim 15, wherein the partial data is distinguished from each other by punctuation information and the name of the partial data is included in the punctuation information.

17. A method of discriminating, for each first level partial data, whether or not saved data, one file of which is composed of a plurality of the first level partial data which are distinguished from each other by punctuation information and each of the first level partial data is able to include a second level partial data, has been unjustifiably rewritten, said method comprising steps of:

(A) at a time of saving a file,
  designating a first level partial data on the basis of a user instruction;
  receiving a password from a user;
  converting the received password and the designated first level partial data, from which the content of a second level partial data is omitted and which includes the punctuation information, according to a predetermined procedure to generate a first code; and
  saving the file with storing of the first code to correspond to the designated first level partial data;

(B) at a time of reading the saved file,
  reading the saved file;
  designating the first level partial data on the basis of a user instruction;
  receiving the password from the user;
  converting the received password and the designated first level partial data, from which the content of the second level partial data is omitted and which includes the punctuation information, according to said predetermined procedure to generate a second code;
  comparing the generated second code with the first code stored to correspond to the designated first level partial data; and
  discriminating that the designated first level partial data has been unjustifiably rewritten if comparison results in a fact that the first code is not equal to the second code.

18. The method according to claim 17, wherein the data is a text.

19. The method according to claim 17, wherein the data is a program.

20. The method according to claim 12, wherein the punctuation information belongs to each partial data and the first code is stored while being included in the punctuation information belonging to the partial data to which the code corresponds.

21. The method according to claim 9, wherein each of the partial data is given a name in the punctuation information there of and designation of the partial data is performed with the name of the partial data.

22. A method of discriminating, for each first level partial data, whether or not saved data, one file of which is composed of a plurality of the first level partial data which are distinguished from each other by punctuation information and each of the first level partial data is able to include a second level partial data, has been unjustifiably rewritten, said method comprising steps of:

(A) at a time of saving a file,
  designating a first level partial data on the basis of a user instruction;
  receiving a password from a user;
  converting the received password and the designated first level partial data, which is processed in accordance with a selected processing method, according to a predetermined procedure to generate a first code; and
  saving the file with storing of the first code to correspond to the designated first level partial data;

(B) at a time of reading the saved file,
  reading the saved file;
  designating the first level partial data on the basis of a user instruction;
  receiving the password from the user;
  converting the received password and the designated first level partial data, which is processed in accordance with a selected processing method if the designated first level partial data includes the second level partial data, according to said predetermined procedure to generate a second code;
  comparing the generated second code with the first code stored to correspond to the designated first level partial data; and
  discriminating that the designated first level partial data has been unjustifiably rewritten if comparison results in a fact that the first code is not equal to the second code.

23. The method according to claim 22, wherein the selectable processing method includes a processing method in which, if the designated partial data includes the other partial data, the partial data is included.

24. The method according to claim 22, wherein the selectable processing method includes a processing method in which, if the designated partial data includes the other partial data, the contents of said partial data is omitted and punctuation information is included.

25. The method according to claim 22, wherein the selectable processing method includes a processing method in which, if the designated partial data includes the other partial data, the partial data is omitted.

26. A method of discriminating, for each first level partial data, whether or not saved data, one file of which is composed of a plurality of the first level partial data which are distinguished from each other by punctuation information and each of the first level partial data is able to include a second level partial data, has been unjustifiably rewritten, said method comprising steps of:

(A) at a time of saving a file,
  designating a first level partial data on the basis of a user instruction;
  receiving a password from a user;
  in a case where the designated first level partial data includes the second level partial data, referring to control information about the included second level partial data;
  converting the received password and the designated first level partial data, which is processed in accordance with the control information, according to a predetermined procedure to generate a first code; and
  saving the file with storing of the first code to correspond to the designated first level partial data;

(B) at a time of reading the saved file, reading the saved file;

designating the first level partial data on the basis of a user instruction;

receiving the password from the user;

in a case where the designated first level partial data includes the second level partial data, referring to control information about the second level partial data;

converting the received password and the designated first level partial data, which is processed in accordance with the control information if the designated first level partial data includes the second level partial data, according to said predetermined procedure to generate a second code;

comparing the generated second code with the first code stored to correspond to the designated first level partial data; and discriminating that the designated first level partial data has been unjustifiably rewritten if comparison results in a fact that the first code is not equal to the second code.

27. The method according to claim 26, wherein the control information is information for identifying am author of the partial data.

28. The method according to claim 27, wherein, in the process of the second level partial data, the partial data is included in the designated first level partial data if the author of the second level partial data and that of the designated first level partial data are the same.

29. The method according to claim 28, wherein, if information for identifying the author is not provided for the second level partial data, a discrimination is made that the author of the first level partial data including the second level partial data and that of the second level partial data are the same.

30. A method of discriminating, for each first level partial data, whether or not saved data, on file of which is composed of a plurality of the first level partial data which are distinguished from each other by punctuation information and each of the first level partial data is able to include a second partial data, has been unjustifiably rewritten, said method comprising steps of:

(A) at a time of saving a file, designating a first level partial data on the basis of a user instruction;

receiving a password from a user;

in a case where the designated first level partial data includes a second level partial data, referring to a processing method set for the designated first level partial data;

converting the received password and the designated first level partial data, which is obtained by processing the first level partial data by said processing method if the designated first level partial data includes the second level partial data, according to a predetermined procedure to generate a first code; and saving the file with storing of the first code to correspond to the designated first level partial data;

(B) at a time of reading the saved file, reading the saved file;

designating the first level partial data on the basis of a user instruction;

receiving the password from the user;

in a case where the designated first level partial data includes the second level partial data, referring to a processing method set for the designated first level partial data;

converting the received password and the designated first level partial data, which is obtained by processing the first level partial data by said processing method if the designated first level partial data includes the second level partial data, according to said predetermined procedure to generate a second code;

comparing the generated second code with the first code stored to correspond to the designated partial data; and discriminating that the designated first level partial data has been unjustifiably rewritten if comparison results in a fact that the first code is not equal to the second code.

31. The method according to claim 30, wherein the processing method which can be set includes a processing method in which, if the designated first level partial data includes the second level partial data, the second level partial data is included.

32. The method according to claim 30, wherein the processing method which can be set includes a processing method in which, if the designated first level partial data includes the second level partial data, the contents of the second level partial data is omitted and punctuation information is included.

33. The method according to claim 30, wherein two types of processing methods which can be set are provided and are set by registering the name of partial data to which either of the two processing methods must be applied.

34. The method according to claim 30, wherein setting of the processing method is described the punctuation information for each partial data.

* * * * *

UNITED STATES PATENT AND TRADEMARK OFFICE
CERTIFICATE OF CORRECTION

PATENT NO. : 5,440,731
DATED : August 8, 1995
INVENTOR(S) : MASAAKI NAGASHIMA, ET AL.

It is certified that error appears in the above-identified patent and that said Letters Patent is hereby corrected as shown below:

COLUMN 2

Line 35, "to," should read --to--.

COLUMN 10

Line 27, "a" should read --as--.
   Line 35, "is" should read --is a--.

COLUMN 16

Line 35, "Also" should read --Also,--.
   Line 36, "the" (first occurrence) should be deleted.
   Line 62, "Also" should read --Also,--.

COLUMN 20

Line 30, "Also" should read --Also,--.
   Line 41, "Also" should read --Also,--.

COLUMN 21

Line 15, "chile" should be deleted.
   Line 16, "are" should read --is--.

COLUMN 22

Line 45, "author'" should read --author's--.
   Line 61, "author'" should read --author's--.

UNITED STATES PATENT AND TRADEMARK OFFICE
CERTIFICATE OF CORRECTION

PATENT NO. : 5,440,731
DATED : August 8, 1995
INVENTOR(S) : MASAAKI NAGASHIMA, ET AL.

It is certified that error appears in the above-identified patent and that said Letters Patent is hereby corrected as shown below:

COLUMN 25

Line 3, "the" (first occurrence) should be deleted.
    Line 62, "process" should read --processes--.

COLUMN 26

Line 27, "dat" should read --data--.

COLUMN 29

Line 19, "particularly," should read --particularity,--.

COLUMN 30

Line 57, "form" should read --from--.

COLUMN 33

Line 25, "am" should read --an--.

UNITED STATES PATENT AND TRADEMARK OFFICE
CERTIFICATE OF CORRECTION

PATENT NO. : 5,440,731
DATED : August 8, 1995
INVENTOR(S) : MASAAKI NAGASHIMA, ET AL.

It is certified that error appears in the above-identified patent and that said Letters Patent is hereby corrected as shown below:

COLUMN 34

Line 51, "described" should read --described in--.

Signed and Sealed this

Twenty-sixth Day of December, 1995

BRUCE LEHMAN

Attest:

Attesting Officer        Commissioner of Patents and Trademarks